(12) United States Patent
Gohshi

(10) Patent No.: US 9,014,502 B2
(45) Date of Patent: Apr. 21, 2015

(54) SIGNAL PROCESSING DEVICE, CONTROL PROGRAM AND INTEGRATED CIRCUIT

(75) Inventor: Seiichi Gohshi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/004,261

(22) PCT Filed: Mar. 8, 2012

(86) PCT No.: PCT/JP2012/055934
§ 371 (c)(1),
(2), (4) Date: Sep. 10, 2013

(87) PCT Pub. No.: WO2012/124591
PCT Pub. Date: Sep. 20, 2012

(65) Prior Publication Data
US 2014/0044376 A1    Feb. 13, 2014

(30) Foreign Application Priority Data
Mar. 15, 2011    (JP) .................................. 2011-057257

(51) Int. Cl.
*G06K 9/40*    (2006.01)
*G06T 5/00*    (2006.01)
*H04N 5/14*    (2006.01)

(52) U.S. Cl.
CPC ................ *G06T 5/003* (2013.01); *H04N 5/142* (2013.01)

(58) Field of Classification Search
None
See application file for complete search history.

(56) References Cited

U.S. PATENT DOCUMENTS

| | | | |
|---|---|---|---|
| 6,173,084 B1 * | 1/2001 | Aach et al. ..................... | 382/260 |
| 7,970,212 B2 * | 6/2011 | Zahavi et al. ................. | 382/207 |
| 8,508,667 B2 * | 8/2013 | Goshi ............................ | 348/627 |
| 8,824,825 B2 * | 9/2014 | Gohshi ......................... | 382/263 |
| 2003/0210829 A1 * | 11/2003 | Someya et al. ................ | 382/263 |
| 2005/0008251 A1 * | 1/2005 | Chiang ........................... | 382/266 |
| 2007/0070248 A1 * | 3/2007 | Zhou et al. .................... | 348/581 |
| 2009/0074328 A1 | 3/2009 | Matsumoto et al. | |
| 2010/0119176 A1 * | 5/2010 | Ichihashi et al. ............... | 382/300 |
| 2011/0279730 A1 | 11/2011 | Goshi | |
| 2013/0034271 A1 * | 2/2013 | Sakaguchi et al. ............. | 382/107 |
| 2014/0044376 A1 * | 2/2014 | Gohshi ......................... | 382/263 |

FOREIGN PATENT DOCUMENTS

| | | |
|---|---|---|
| GB | 2 203 013 A | 10/1988 |
| JP | 07-143365 A | 6/1995 |
| JP | 2007-295321 A | 11/2007 |
| JP | 2009-070123 A | 4/2009 |
| WO | 2010/113342 A1 | 10/2010 |

OTHER PUBLICATIONS

Official Communication issued in International Patent Application No. PCT/JP2012/055934, mailed on Jun. 5, 2012.

* cited by examiner

*Primary Examiner* — Andrae S Allison
(74) *Attorney, Agent, or Firm* — Keating & Bennett, LLP

(57) ABSTRACT

A signal processing device that processes sharpening of an image with respect to an input signal (SR) that represents the image and outputs an output signal (SO) that represents the sharpened image includes an oversampler that generates an oversampled signal by interpolating a signal in order to increase a sampling frequency with respect to an input signal (SR), and a sharpening processing unit to which the oversampled signal is inputted and which generates a sharpened signal in which high frequency band components in the oversampled signal are nonlinearly monotonically increased in a broad sense, and the sharpened signal is outputted as the output signal (SO).

13 Claims, 21 Drawing Sheets

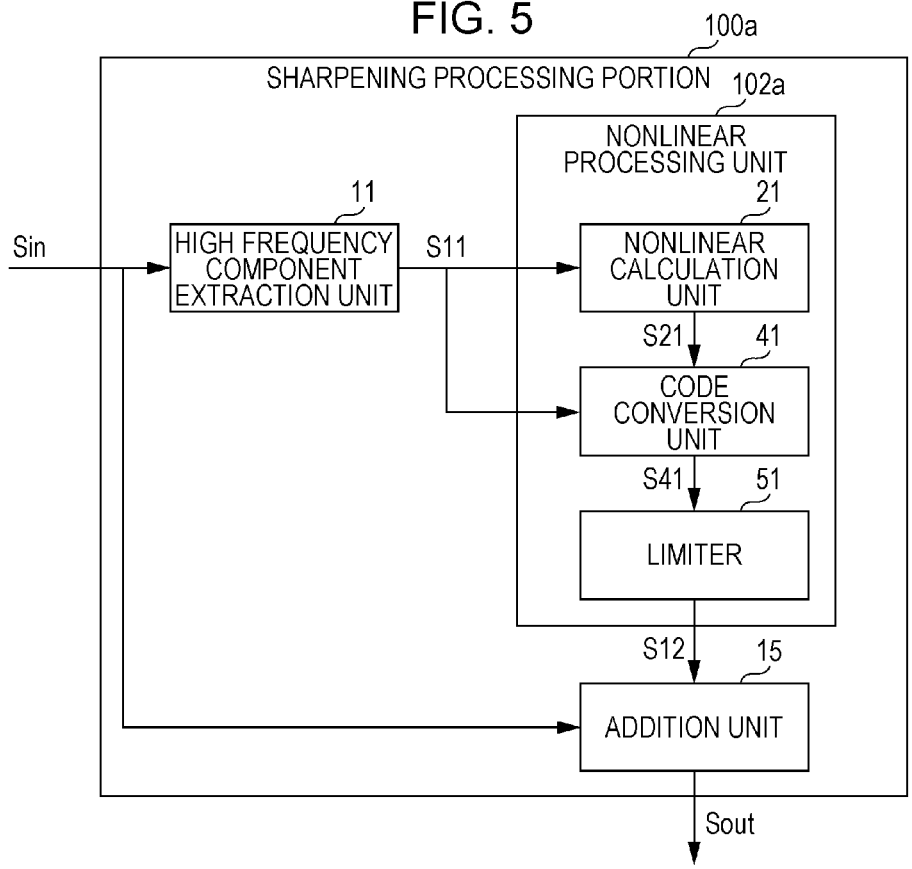
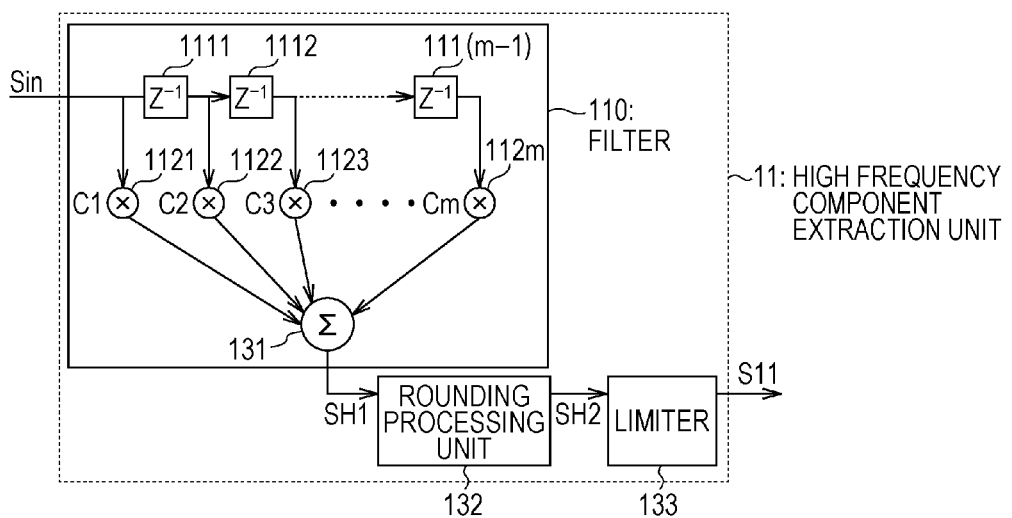

FIG. 22
(a) IMAGE (ORIGINAL IMAGE) REPRESENTED BY INPUT SIGNAL SR
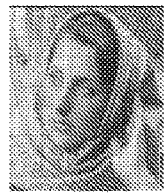
(b) IMAGE REPRESENTED BY SHARPENED SIGNAL S100
(c) IMAGE REPRESENTED BY OVERSAMPLING SIGNAL S200
(d) IMAGE REPRESENTED BY DOWNSAMPLING SIGNAL S300

SIGNAL PROCESSING DEVICE, CONTROL PROGRAM AND INTEGRATED CIRCUIT

TECHNICAL FIELD

The present invention relates to a signal processing device or the like which improves image quality by sharpening an image.

BACKGROUND ART

From the related art, in order to improve image quality of an image using an image processing device or the like, the processing (hereinafter, referred to as sharpening processing) for sharpening the image is performed. For example, in a television receiver of the related art, a contour compensation for steepening the rising and falling of an image signal corresponding to a contour portion in the image which is displayed in the receiver is performed. The contour compensation is performed by extracting high-frequency components of the image signal (brightness signal) which is inputted to a display of the television receiver and by adding the high-frequency components which are obtained by amplifying the extracted high-frequency components to the inputted image signal. Thereby, frequency characteristics of the image signal which are degraded by the processing performed by each circuit in the television receiver are improved, and image quality of an appearance is improved.

As a technology related to the sharpening of the image, there is a technology which is disclosed in PTL 1. The technology disclosed in PTL 1 is a technology related to the image processing device that performs a high resolution processing suitable for each area.

CITATION LIST

Patent Literature

PTL 1: Japanese Unexamined Patent Application Publication No. 2009-070123 (publication date: 2009, 4. 2)

SUMMARY OF INVENTION

Technical Problem

In the sharpening processing for performing a linear calculation with respect to the image signal which is an object of processing, frequency components near a Nyquist frequency fs/2 which is half of a sampling frequency fs increase, but frequency components (that is, high-frequency components not included in the image signal which is the object of processing) beyond the Nyquist frequency fs/2 cannot be used. As such, in particular, in a case where the image is enlargement-processed, the image quality cannot be sufficiently improved.

For example, in a case where an image with a resolution equal to or less than half of a full high-definition such as displayed by an analog television or the like of the related art is enlargement-processed to be displayed in the display in the television receiver of a High Definition Television (HDTV) (full high-definition of 1080×1920 pixels), even though the sharpening processing using the linear calculation is performed with respect to the enlargement-processed image signal, it is impossible to extract the high-frequency components near the Nyquist frequency Fbs/2 in the enlargement-processed image signal (in addition, the sampling frequency Fbs of the enlargement-processed image signal is twice the sampling frequency fs (Fbs=2fs)). As a result, the enlargement-processed image is displayed as being blurred.

In addition, in the sharpening processing which performs a nonlinear calculation with respect to the image signal which is the object of processing, it is possible to use the high-frequency components (that is, high-frequency components not included in the image signal which is the object of processing) beyond the Nyquist frequency fs/2. However, as a sharpening degree increases, such high band frequency components are increased, and a distortion can occur. For this reason, it is not possible to sufficiently increase the sharpening degree.

In addition, in the image processing device disclosed in PTL 1, in a case where there is an object moving within the image, the movement area is extracted, and the extracted area is replaced with an image in which blurring is small. Here, when the size of the moving object (area) changes, the movement area can be incorrectly extracted. In addition, even though it is replaced with the image in which the blurring is small, high-frequency components (that is, high-frequency components not included in the image signal which is the object of processing) higher than the Nyquist frequency is not used, and thus the image quality cannot be sufficiently improved.

The present invention has been made in view of the above problems, and an object of the present invention is to provide a signal processing device which can highly sharpen an image using a simple configuration, a control program and an integrated circuit.

Solution to Problem

In order to solve the above problems, a signal processing device according to the present invention, performs processing to sharpen an image represented by an input signal, outputs an output signal that represents the sharpened image, includes signal interpolation means that generates an interpolated signal by performing signal interpolation in order to increase a sampling frequency with respect to the input signal, and sharpening means to which the interpolated signal is inputted and which generates a sharpened signal in which high band frequency components in the interpolated signal are nonlinearly monotonically increased in a broad sense, and outputs the sharpened signal as the output signal.

In addition, an integrated circuit according to the present invention, performs processing to sharpen an image represented by an input signal, outputs an output signal that represents the sharpened image, includes a signal interpolation circuit that generates an interpolated signal by performing the signal interpolation in order to increase a sampling frequency with respect to the input signal, and sharpening circuit to which the interpolated signal is inputted and which generates a sharpened signal in which high band frequency components in the interpolated signal are nonlinearly monotonically increased in a broad sense, and outputs the sharpened signal as the output signal.

According to the above configuration, an interpolated signal is generated by interpolating the signal in order to increase the sampling frequency with respect to the input signal. That is, the interpolated signal is generated by performing the oversampling with respect to the input signal. Then, the sharpened signal in which the high band frequency components in the interpolated signal are nonlinearly monotonically increased in a broad sense is generated, and the sharpened signal is outputted as the output signal.

Thus, it is possible to generate the sharpened signal in which the high band frequency components in the interpolated signal are nonlinearly monotonically increased in a broad sense. The interpolated signal is generated by increasing the sampling frequency of the input signal. Here, the processing "which is nonlinearly monotonically increased in a broad sense" is nonlinear processing such as an exponentiation calculation. For this reason, by nonlinearly monotonically increasing in a broad sense the high-frequency components of the interpolated signal, the high-frequency components not included in the interpolated signal are added to the interpolated signal. Specifically, the frequency components higher than the vicinity of the Nyquist frequency that is a frequency which is half of the sampling frequency of a case where the interpolated signal is discretized, and the Nyquist frequency, are added to the interpolated signal. Thereby, the rising and falling of the interpolated signal is steepened, and the image is sharpened. In addition, in the processing which performs the linear calculation with respect to the interpolated signal, it is impossible to compensate a high-frequency band beyond the Nyquist frequency.

Incidentally, in a case where the processing which is nonlinearly monotonically increased in a broad sense with respect to the input signal is directly performed, if the sharpening is strengthened by using the high-frequency components of the high-frequency band, a distortion can occur in the high-frequency components. For this reason, in order to prevent the distortion from occurring, it is necessary to suppress the levels of the frequency components to be added. As a result, the sharpening degree cannot be increased.

On the other hand, since the high-frequency components in the input signal are composed of frequency components of a middle band or a low band in the interpolated signal, even though the processing in which the high band frequency components in the interpolated signal are nonlinearly monotonically increased in a broad sense is performed, it is possible to add the high-frequency components without the distortion being occurred near the Nyquist frequency of the interpolated signal. Thus, there is an effect which can increase the sharpening degree without necessity of suppressing the levels of the frequency components to be added.

Further, in general, a filter which extracts the high-frequency components near the Nyquist frequency of the input signal requires many tap numbers. On the other hand, a filter which extracts the frequency components in the middle band or the low band of the interpolated signal is satisfied with a tap number less than that of the filter which extracts the high-frequency components. That is, in a case where the sharpened signal which is nonlinearly monotonically increased in a broad sense with respect to the high band frequency components in the interpolated signal is generated, there is an effect that can accomplish a device minimization, a cost reduction and a processing load reduction.

As describe above, according to the signal processing device and the integrated circuit of the present invention, it is possible to greatly improve image quality and resolution by greatly (strongly) sharpening the image more than those of the related art, and there is an effect which can accomplish the device minimization, the cost reduction and the processing load reduction.

Advantageous Effects of Invention

As described above, a signal processing device according to the present invention, performs processing to sharpen an image represented by an input signal, outputs an output signal that represents the sharpened image, includes signal interpolation means that generates an interpolated signal by performing the signal interpolation in order to increase a sampling frequency with respect to the input signal, and sharpening means to which the interpolated signal is inputted and which generates a sharpened signal in which high band frequency components in the interpolated signal are nonlinearly monotonically increased in a broad sense, and outputs the sharpened signal as the output signal.

In addition, an integrated circuit according to the present invention, performs processing to sharpen an image represented by an input signal, outputs an output signal that represents the sharpened image, includes a signal interpolation circuit that generates an interpolated signal by performing the signal interpolation in order to increase a sampling frequency with respect to the input signal, and sharpening circuit to which the interpolated signal is inputted and which generates a sharpened signal in which high band frequency components in the interpolated signal are nonlinearly monotonically increased in a broad sense, and outputs the sharpened signal as the output signal.

Thus, it is possible to generate the sharpened signal in which the high band frequency components in the interpolated signal are nonlinearly monotonically increased in a broad sense. The interpolated signal is generated by increasing the sampling frequency of the input signal.

Therefore, it is possible to add the high-frequency components without the distortion being occurred near the Nyquist frequency of the interpolated signal. Thus, there is an effect which can increase the sharpening degree without necessity of suppressing the levels of the frequency components to be added. In addition, since a tap number of the filter which extracts the frequency components can be suppressed, there is an effect that can accomplish the device minimization, the cost reduction and the processing load reduction.

Other objects, features and outstanding points of the present invention will be made clear by the description shown below. In addition, advantages of the present invention will be apparent from the following description in conjunction with the accompanying drawings.

BRIEF DESCRIPTION OF DRAWINGS

FIG. 2($b$) is a block diagram illustrating still another schematic configuration of the signal processing device according to the present invention.

FIG. 3($a$) is a pattern diagram illustrating an example of a frequency spectrum of an input signal which is inputted to the signal processing device illustrated in FIGS. 1 and 2. FIG. 3($b$) is a pattern diagram illustrating an example of a frequency spectrum of an oversampled signal which is obtained by doubling a sampling frequency of an input signal having a frequency spectrum illustrated in FIG. 3($a$) using an oversampler of the signal processing device illustrated in FIG. 1. FIG. 3($c$) is a pattern diagram illustrating an example of a frequency spectrum of a sharpened signal which is obtained by performing a sharpening processing using a sharpening processing unit of the signal processing device illustrated in FIGS. 1 and 2, with respect to the oversampled signal having the frequency spectrum illustrated in FIG. 3($b$). FIG. 3($d$) is a pattern diagram illustrating an example of a frequency spectrum of a downsampled signal which is obtained by halving the sharpened signal having the frequency spectrum illustrated in FIG. 3(c) by using a downsampler of the signal processing device illustrated in FIG. 2. FIG. 3(e) is a pattern diagram illustrating an example of a frequency spectrum of a signal which is obtained by performing the sharpening processing using a linear calculation, with respect to the oversampled signal having the frequency spectrum illustrated in FIG. 3(b). FIG. 3(f) is a pattern diagram illustrating an example of a frequency spectrum of a signal which is obtained by strongly performing a sharpening using a sharpening processing unit of the signal processing device illustrated in FIGS. 1 and 2, without performing an oversampling, with respect to an input signal having the frequency spectrum illustrated in FIG. 3(a).

FIG. 5 is a block diagram illustrating a configuration of a sharpening processing portion which is included in the signal processing device illustrated in FIG. 4.

FIG. 6 is a block diagram illustrating a configuration of a high-frequency component extracting unit which is included in the sharpening processing portion illustrated in FIG. 5.

FIG. 22(a) is a view illustrating an example of an original image which is represented by an input signal SR. FIG. 22(b) is a view illustrating an example of an image represented by an oversampled signal which is obtained by an oversampling of an input signal which represents the image illustrated in FIG. 22(a). FIG. 22(c) is a view illustrating an example of an image represented by a sharpened signal which is obtained by the sharpening processing portion illustrated in FIG. 5 from an oversampled signal which represents the image illustrated in FIG. 22(b). FIG. 22(d) is a view illustrating an example of an image represented by a downsampled signal which is obtained by a downsampling from a sharpened signal which represents the image illustrated in FIG. 22(c).

DESCRIPTION OF EMBODIMENTS

1. Summary of Signal Processing Device

A signal processing device (integrated circuit) 500 according to each embodiment is, schematically speaking, a device which performs a sharpening processing for sharpening an image after an oversampling is performed with respect to a digital signal (hereinafter, also referred to as an image signal) which represents the image. Here, in the sharpening processing which is performed by the signal processing device 500, a signal processing using a nonlinear calculation is performed with respect to high-frequency components of the input signal. For this reason, the sharpening processing which is performed by the signal processing device 500 adds the high-frequency components which can not be used in the sharpening processing which uses a linear calculation to the image signal. Details of the sharpening processing which is performed by the signal processing device 500 will be described later.

In addition, in the present specification, when signal processing devices 500a to 500f, will be described later, are not distinguished, they will be simply referred to as a "signal processing device 500". In addition, hereinafter, the image signal which is inputted to the signal processing device 500 is referred to as an input signal SR. In addition, the image signal which is outputted from the signal processing device 500 is referred to as an output signal SO.

Figure 1:
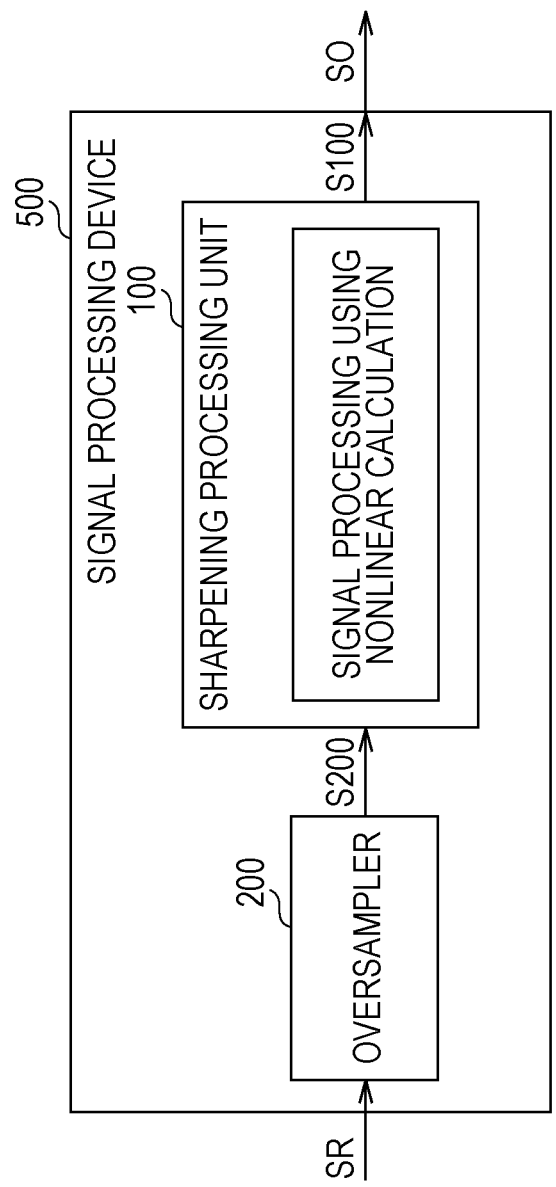
FIG. 1 is a block diagram illustrating a schematic configuration of a signal processing device according to the present invention.
Figure 2:
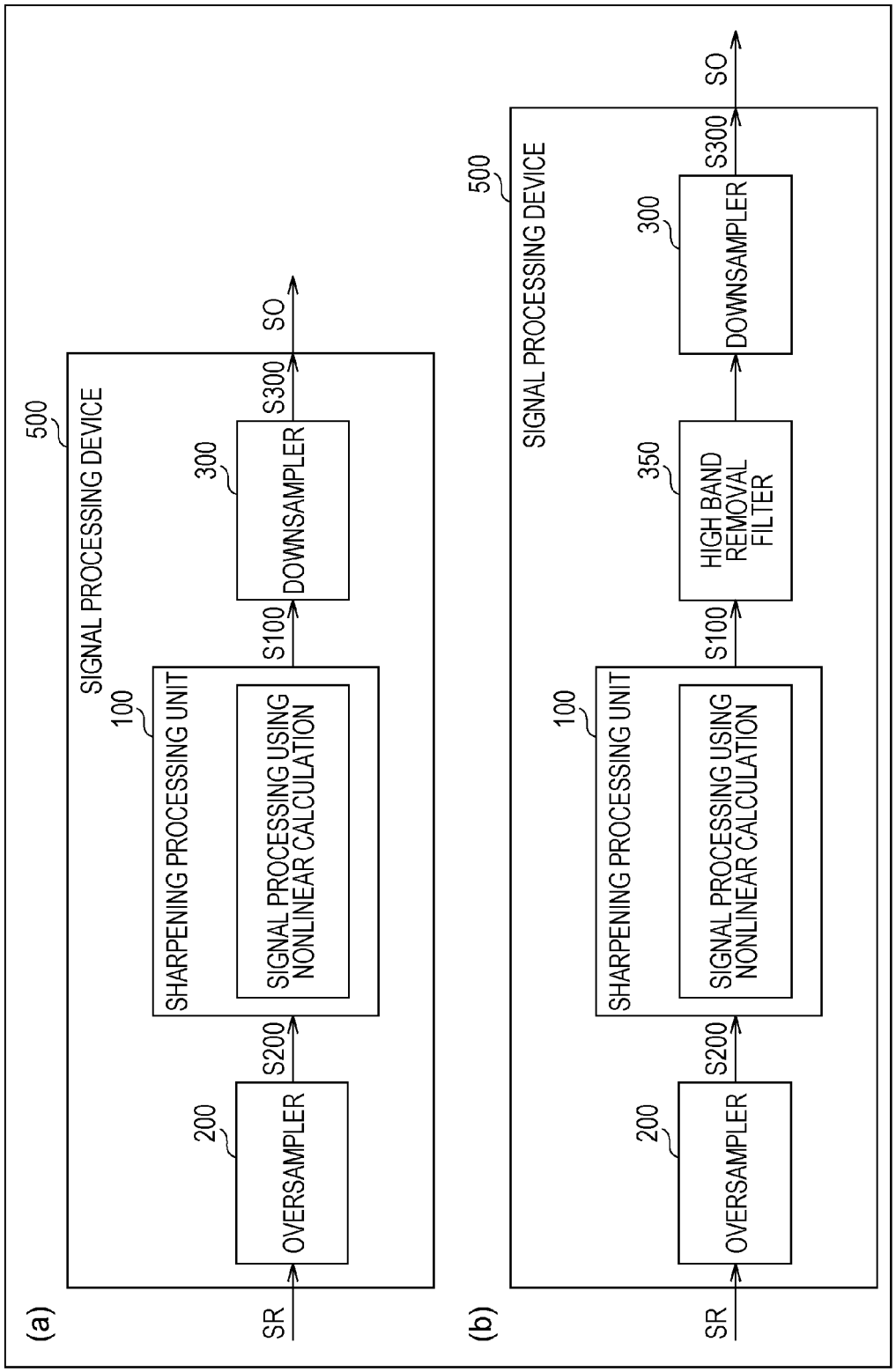
FIG. 2($a$) is a block diagram illustrating another schematic configuration of the signal processing device according to the present invention.

With reference to FIGS. 1 and 2, a schematic configuration of the signal processing device 500 will be described. FIGS. 1 and 2 are block diagrams illustrating the schematic configuration of the signal processing device 500. As illustrated in FIG. 1, the signal processing device 500 includes at least an oversampler (signal interpolation means, signal interpolation circuit) 200 and a sharpening processing unit (sharpening means, sharpening circuit) 100. Further, as illustrated in FIG. 2(a), the signal processing device 500 may include a downsampler (signal thinning means) 300. Whether the downsampler 300 is included or not is determined depending on a field angle of the image which is represented by the output signal SO, as described above. In a case where the downsampler 300 is included, further, as illustrated in FIG. 2(b), the signal processing device 500 may be configured to have a high band removal filter (high-frequency removal means) 350.

The oversampler 200 performs oversampling (interpolation) with respect to the input signal SR, in order to increase a sampling frequency of the input signal SR. The oversampler 200 outputs a signal which is J (J is an arbitrary integer of two or greater) times the sampling frequency of the input signal SR. The signal which is outputted from the oversampler 200 is referred to as an oversampled signal S200 (interpolated signal)

Next, the sharpening processing unit 100 is installed in a rear stage of the oversampler 200. The sharpening processing unit 100 performs sharpening by performing a signal processing using a nonlinear calculation with respect to high band frequency components in the oversampled signal S200. In other words, the sharpening processing unit 100 generates a signal in which the high band frequency components in the oversampled signal S200 are nonlinearly monotonically increased in a broad sense. As a result, a signal is outputted in which the high band frequency components not included in the oversampled signal S200 are added to the oversampled signal S200. Specifically, a signal is outputted in which the high-frequency components higher than a Nyquist frequency and the vicinity of the Nyquist frequency which is the frequency of half of the sampling frequency, in a case where the oversampled signal S200 is discretized are added to the oversampled signal S200. As a result, the sharpening processing unit 100 performs sharpening by steepening rising and falling of the oversampled signal S200. In addition, the signal which is outputted from the sharpening processing unit 100 is referred to as a sharpened signal S100. In a case where the signal processing device 500 does not have a downsampler 300, the sharpened signal S100 becomes the output signal SO.

In addition, the sharpening processing unit 100 may be any type which include a configuration which performs a signal processing using the nonlinear calculation, with respect to the high-frequency components of the oversampled signal S200, but among them, the configuration which includes a sharpening processing portion 100A, will be described later, is most preferred.

Next, the downsampler 300 is installed in a rear stage of the sharpening processing unit 100. The downsampler 300 performs the downsampling (thinning) with respect to the sharpened signal S100 in order to decrease the sampling frequency of the sharpened signal S100. The downsampler 300 outputs a signal which is 1/K times (K is an arbitrary integer of two or greater) the sampling frequency of the sharpened signal S100. In addition, the signal which is outputted from the downsampler 300 is referred to as a downsampled signal S300. In a case where the signal processing device 500 includes the downsampler 300, the downsampled signal S300 becomes the output signal SO.

Next, a high band removal filter 350 is installed in a rear stage of the sharpening processing unit 100 and in a previous stage of the downsampler 300. The high band removal filter 350 is a low pass filter generally known, and removes high-frequency components of the sharpened signal S100. The high band removal filter 350 may be any type which remove predetermined high band frequency components which are included in the sharpened signal S100. In addition, the high band removal filter 350 may be a one-dimensional filter or a two-dimensional filter. In addition, a frequency characteristic of the high band removal filter 350 is appropriately adjusted by a filter coefficient. As to why the high band removal filter 350 is included will be described later. In addition, the high band removal filter 350 may be installed to be integrated with the sharpening processing unit 100, and to be integrated with the downsampler 300.

In addition, an image (hereinafter, also referred to as an original image) which is represented by the input signal SR may be a still image or a moving image. Further, for example, the moving image is displayed in real time by a receiving set of a Standard Definition Television (SDTV), a receiving set of a High Definition Television (HDTV) or the like. In addition, the moving image is assumed to be configured from multiple frames (screen) with temporal succession.

In addition, the input signal SR is described as being configured by a data column (sequence of pixel values) which are formed from the pixel values of the pixels arranged adjacent to each other in a horizontal-direction of the image, but may be configured by data columns which are formed from the pixel values of the pixels arranged adjacent to each other and adjacent to each other in a vertical-direction of the image.

2. An Example of Frequency Spectrum of Each Signal

Figure 3:
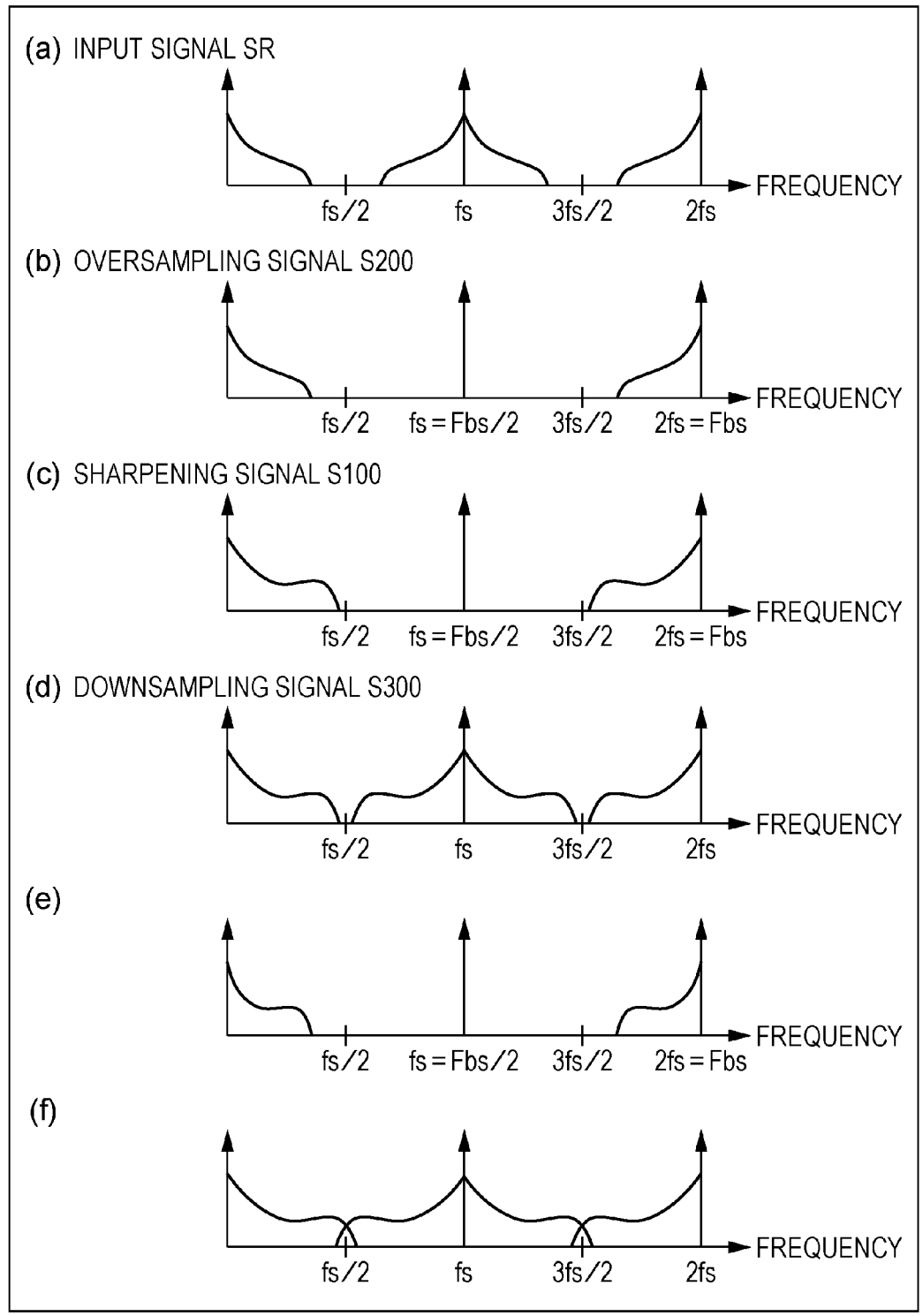
FIG. 3 is a pattern diagram illustrating an example of a frequency spectrum of a signal which is treated in each unit of the signal processing device illustrated in FIGS. 1 and 2.

Next, with reference to FIG. 3, one example of a frequency spectrum of a signal which is treated in each unit of the signal processing device 500 will be described. FIG. 3 is a pattern diagram illustrating one example of a frequency spectrum of a signal which is treated in each unit of the signal processing device. In addition, in FIGS. 3(a) to 3(f), a signal does not exist in a frequency band of a high band, but actually, a signal with a minute value exists.

First, FIG. 3(a) is a pattern diagram illustrating an example of a frequency spectrum of an input signal SR. The sampling frequency is represented by fs.

Next, FIG. 3(b) is a pattern diagram illustrating an example of a frequency spectrum of an oversampled signal S200 which is obtained by doubling the sampling frequency of the input signal SR having the frequency spectrum illustrated in FIG. 3(a) using an oversampler 200. The sampling frequency of the oversampled signal S200 is represented by Fbs. In addition, Fbs equals 2fs. As illustrated in FIG. 3(b), frequency components do not exist between the Nyquist frequency fs/2 with respect to the sampling frequency fs of the input signal SR, and the Nyquist frequency Fbs/2 (=fs) with respect to a new sampling frequency Fbs.

Next, FIG. 3(c) is a pattern diagram illustrating an example of a frequency spectrum of a sharpened signal S100 which is obtained by performing a sharpening processing using a sharpening processing unit 100, with respect to the oversampled signal S200 having the frequency spectrum illustrated in FIG. 3(b). As illustrated in FIG. 3(c), the high-frequency components in the vicinity (and the vicinity of 3fs/2) of the Nyquist frequency fs/2 are added to the related frequency spectrum. That is, high-frequency components which are not included in the input signal SR are added. The reason that the high-frequency components which are not included in the input signal SR are added is for using the nonlinear calculation in the sharpening processing using the sharpening processing unit 100.

FIG. 3(d) is a pattern diagram illustrating an example of a frequency spectrum of a downsampled signal S300 which is obtained by halving the sharpened signal S100 having the frequency spectrum illustrated in FIG. 3(c) using the downsampler 300. The sampling frequency of the downsampled signal S300 is fs. As illustrated in FIG. 3(d), as compared to the frequency spectrum illustrated in FIG. 3(a), the high-frequency components near the Nyquist frequency fs/2 increase. Therefore, the image which is represented by the downsampled signal S300 having the frequency spectrum illustrated in FIG. 3(d) becomes one in which the rising and falling of the signal corresponding to a contour portion (edge) included in the image is steepened more than those of the image which is represented by the input signal SR having the frequency spectrum illustrated in FIG. 3(a). As a result, the image which is represented by the downsampled signal S300 is sharpened more than the original image which is represented by the input signal SR, and the image quality is considerably improved.

3. Reason of Sharpening Processing using Nonlinear Calculation

With reference to FIG. 3(e), a frequency spectrum which is obtained when the sharpening processing is performed by the linear calculation instead of the sharpening processing unit 100 with respect to the oversampled signal S200 having the frequency spectrum illustrated in FIG. 3(b) will be described.

FIG. 3(e) is a pattern diagram illustrating an example of a frequency spectrum of a signal which is obtained by performing the sharpening processing using a linear calculation, with respect to the oversampled signal S200 having the frequency spectrum illustrated in FIG. 3(b). In the frequency spectrum illustrated in FIG. 3(e), the high-frequency components which are included in the input signal SR are increased by the related sharpening processing, but, unlike the frequency spectrum illustrated in FIG. 3(c), the high-frequency components in the high band which are not included in the input signal SR are not added. For this reason, as compared to the sharpening using the sharpening processing unit 100, a sharpening degree decreases.

4. Reason for Performing Sharpening Processing after Performance of Oversampling Without performing of the oversampling with respect to the input signal SR having the frequency spectrum illustrated in FIG. 3(e), by directly performing the sharpening processing using the sharpening processing unit 100, it is not impossible to obtain a signal similar to the signal having the frequency spectrum illustrated in FIG. 3(d). However, that the sharpening processing is performed by the sharpening processing unit 100 after performing of the oversampling leads to superiority described in the following [1] and [2].

[1] Minimization, Cost Reduction, and Processing Load Decrease is Possible

A filter (hereinafter, referred to as filter A) which extracts related high-frequency components in order to increase the high-frequency components near the Nyquist frequency fs/2 of the input signal SR having the frequency spectrum illustrated in FIG. 3(a) requires a large number of taps. However, in the frequency spectrum illustrated in FIG. 3(b) after the oversampling, the related high-frequency components become middle band frequency components in the vicinity of fs/2 which is half of the Nyquist frequency Fbs/2 (=fs). For this reason, a filter (hereinafter, referred to as filter B) which extracts related middle band frequency components is satisfied with a tap number less than the above-described filter A. That is, it is possible to accomplish a minimization of the signal processing device, a cost reduction, and a processing load decrease. In addition, an example of the above-described filter B is a filter 110 included in a sharpening processing portion 100A, will be described later.

[2] Possibility of Adding High-frequency Components Required for Sharpening Without Distortion In a case where the sharpening is directly performed by the sharpening processing unit 100 without performing an oversampling, with respect to an input signal SR having the frequency spectrum illustrated in FIG. 3(a), when the sharpening degree increases, the frequency components added to the vicinity of the Nyquist frequency increase, and the added frequency components become an overlapped state, thereby causing the distortion (refer to FIG. 3(f)). For this reason, in order not to generate the distortion, it is not possible to sufficiently increase the sharpening degree. That is, the original image cannot be highly sharpened. In addition, it is conceivable to remove the frequency components which cause the distortion, but in this case, it is necessary to remove the frequency components near the Nyquist frequency, thereby a filter with the large number of taps is required and the high band frequency components near the Nyquist frequency is lost. As a result, it is not possible to highly sharpen the original image.

On the other hand, in the oversampled signal S200 having the frequency spectrum illustrated in FIG. 3(b), the frequency components do not exist between fs/2 to ifs/2. Accordingly, even though the sharpening processing is performed by the sharpening processing unit 100, it is possible to sufficiently add the high-frequency components without generation of a distortion. Thus, it is possible to sufficiently increase the sharpening degree. That is, it is possible to greatly sharpen the original image.

In addition, in FIG. 3(c), in a case where frequency components which exceed fs/2 and fall below 3fs/2 are included in the sharpened signal S100 which is outputted from the sharpening processing unit 100, when the downsampling is performed by the downsampler 300, the distortion can be generated near the Nyquist frequency fs/2 in the downsampled signal S300. For this reason, in a case where the signal processing device 500 has a configuration which includes the downsampler 300, it is preferred that the sharpening processing unit 100 removes from the sharpened signal S100 the frequency components which cause the distortion. That is, as illustrated in FIG. 2(b), it is preferred that the signal processing device 500 has a configuration which includes the high band removal filter 350. According to the related configuration, after the frequency components which cause the distortion is removed, the downsampling is performed, and thus it is possible to suppress the generation of the distortion in the downsampled signal S300 to be suppressed.

5. Example with and without Downsampler

According to a field angle of the image represented by the output signal SO, it is determined whether the signal processing device 500 needs to have the downsampler 300 or not. For example, after a signal for a display (so-called 4 k display) with the pixel number of about 4000×2000 is obtained by oversampling the input signal SR for the High Definition Television (HDTV) using the oversampler 200, the sharpening processing is performed by the signal processing device 500 with respect to the related signal. In a case where the sharpened signal S100 after the related sharpening processing is outputted to the 4 k display as it is, the downsampler 300 is not required.

On the other hand, in a case where the output signal SO needs to be outputted by decreasing the sampling frequency of the sharpened signal S100, it is necessary to include the downsampler 300. For example, in a case where the field angle of the image represented by the input signal SR and the field angle of the image represented by the output signal SO are the same as each other, the downsampler 300 with the same downsampling ratio as that obtained by the oversampler 200 is included.

In addition, as another example, a case where the input signal SR is a signal for a Standard Definition Television (SDTV) (horizontal pixel number: 720) and the output signal SO is a signal for a High Definition Television (HDTV) (horizontal pixel number: 1920) can be conceivable. In this case, the input signal SR is oversampled to a signal with the horizontal pixel number of 5670 which is a least common multiple of 720 and 1920, sharpening-processed in the signal processing device 500 with respect to the related signal, and downsampled, thereby becoming the output signal SO.

Further, the oversampling and the downsampling may be performed in a time-direction. For example, a method of 60 fields (30 frames) per second is used in Japan and in the U.S., and a method of 50 fields (25 frames) per second is used in Europe. So, in a case where the input signal SR and the output signal SO are switched between these, the input signal SR is oversampled to a signal with 300 fields per second which is a least common multiple of 60 and 50, the sharpening processing is performed by the signal processing device 500 with respect to the related signal, and the downsampling is performed, thereby the output signal SO is generated.

6. Embodiment 1

With reference to FIGS. 4 to 16, an embodiment according to the present invention will be described as follows. In addition, the signal processing device 500 according to the present embodiment is represented as a signal processing device 500a.

Figure 4:
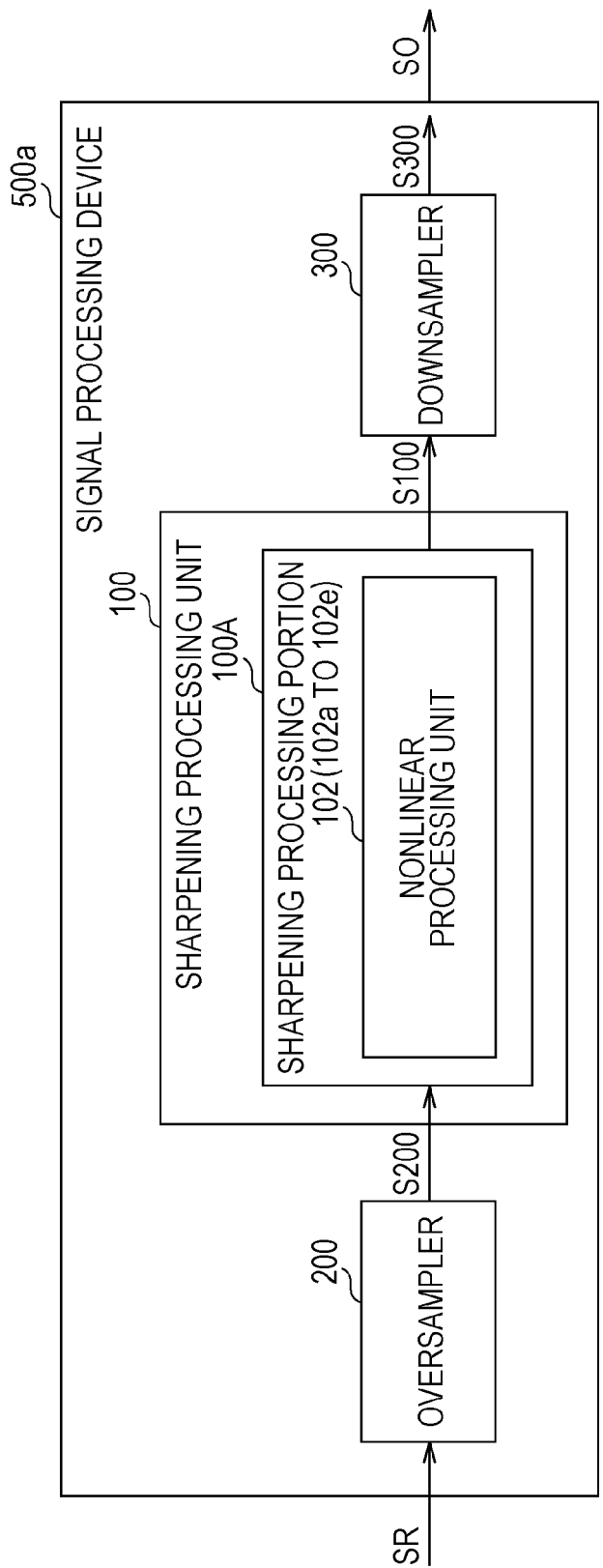
FIG. 4 is a block diagram illustrating a configuration of a signal processing device according to an embodiment of the present invention.

With reference to FIG. 4, the configuration of the signal processing device 500a will be described. FIG. 4 is a block diagram illustrating the configuration of the signal processing device 500a. As illustrated in the same figure, the signal processing device 500a includes at least the oversampler 200, and the sharpening processing unit 100 including the sharpening processing portion (sharpening means, horizontal sharpening means, vertical sharpening means and time sharpening means) 100A. Further, as illustrated in the same figure, the downsampler 300 may be included. Whether the downsampler 300 is included or not is determined according to the field angle of the image which is represented by the output signal SO, as described above. In addition, in the same figure, the configuration without the high band removal filter 350 is illustrated, but the configuration may include the high band removal filter 350.

In addition, the sharpening processing portion 100A may be any one of the configuration examples of the sharpening processing portions 100a to 100e, which will be described later. In the present specification, when the sharpening processing portions 100a to 100e are not distinguished, they are represented as the "sharpening processing portion 100A".

The sharpening processing portion 100A performs the sharpening processing for sharpening a waveform with respect to the signal which is inputted to the sharpening processing portion 100A, and outputs the sharpened signal. Here, the sharpening processing is processing which steepens (enhances) the rising and falling of the signal corresponding to the contour portion (edge) included in the image represented by an incoming signal.

Hereinafter, the signal which is inputted to the sharpening processing portion 100A is also represented as an input signal Sin. In addition, the signal which is outputted from the sharpening processing portion 100A is also represented as an output signal Sout.

In addition, the sharpening processing portion 100A includes, as will be described later, at least a nonlinear processing unit (nonlinear processing means, horizontal nonlinear processing means, vertical nonlinear processing means and time nonlinear processing means) 102 which performs the nonlinear calculation. In the present specification, when the nonlinear processing units 102a to 102e, will be described later, are not distinguished, they are simply represented as the "nonlinear processing unit 102".

Then, the sharpening processing portion 100A can include the high-frequency components which are not included in the input signal Sin in the output signal Sout, by performing the nonlinear calculation in the nonlinear processing unit 102 with respect to the high-frequency components of the input signal Sin. Thus, when the sharpening processing is performed in the sharpening processing portion 100A, the rising and falling of the input signal Sin can be steepened, compared to the sharpening processing using the linear calculation. In addition, the output signal Sout is also represented as a high-frequency of the input signal Sin.

(Detailed Configuration of Sharpening Processing Portion)

Next, a detailed configuration of the sharpening processing portions 100a to 100e will be described.

Configuration Example 1 of Sharpening Processing Portion

FIG. 5 is a block diagram illustrating a configuration of the sharpening processing portion 100a. As illustrated in the same figure, the sharpening processing portion 100a includes a high-frequency component extracting unit (low frequency component removal means, horizontal low frequency component removal means, vertical low frequency component removal means and time low frequency component removal means) 11, a nonlinear processing unit 102a, and an addition unit (addition means, horizontal addition means, vertical addition means and time addition means) 15.

The high-frequency component extracting unit 11 will be first described. Schematically, the high-frequency component extracting unit 11 extracts the high-frequency components included in the input signal Sin, and outputs as a high-frequency signal S11 (low-frequency-removed signal, horizontal low-frequency-removed signal, vertical low-frequency-removed signal and time low-frequency-removed signal). With reference to FIG. 6, the configuration of the high-frequency component extracting unit 11 will be described. FIG. 6 is a block diagram illustrating the configuration of the high-frequency component extracting unit 11.

As illustrated in the same figure, the high-frequency component extracting unit 11 includes a filter 110, a rounding processing unit (low level signal removal means) 132 and a limiter (high level signal removal means) 133.

The filter 110 includes m−1 unit delay elements 111h (h=1, 2, . . . , m−1: m represents a positive integer of three or greater), m multiplication units 112p (p=1, 2, . . . , m) and an addition unit 131, is a transversal type high band pass filter with m taps, and outputs a high band signal SH1 as the input signal Sin is inputted to the filter.

Each of the unit delay elements 111h outputs a signal which is obtained by delaying an inputted signal by unit time. In addition, in the unit delay element 1111 (h=1), the input signal Sin is inputted.

In addition, in a case where the sharpening processing portion 100A performs the sharpening processing in a horizontal-direction (lateral direction, main scanning direction) of the image, each of the unit delay elements 111h outputs the signal (that is, signal which represents the pixel group configured by pixels arranged adjacent to one another in a horizontal-direction of the image represented by an incoming signal) that is obtained by being delayed by unit time in a horizontal-direction of the image represented by the incoming signal. In addition, in a case where the sharpening processing portion 100A performs the sharpening processing with respect to the vertical-direction (lengthwise direction, sub-scanning direction) of the image, each of the unit delay elements 111h outputs the signal (that is, signal which represents the pixel group configured by the pixels arranged adjacent to one another in the vertical-direction of the image represented by the incoming signal) which is delayed by the unit time in the vertical-direction of the image represented by the incoming signal. In addition, in a case where the sharpening processing portion 100A performs the sharpening processing with respect to the time-direction (frame direction) of the image, each of the unit delay elements 111h outputs the signal (that is, signal which represents the pixel group configured by the pixels arranged adjacent to one another in the time-direction of the image represented by the incoming signal) which is delayed by the unit time in the time-direction of the image represented by the incoming signal.

Each of the multiplication units 112p (p=1, 2, . . . , m) multiplies the signal which is inputted by a coefficient Cp (p=1, 2, . . . , m), and outputs the multiplied results to the addition unit 131. Here, the coefficient Cp is set in advance so that the filter 110 functions as a high band pass filter. For example, in a case where m=3, the filter 110 functions as the high band pass filter by being set to C1=0.5, C2=−1 and C3=0.5.

The addition unit 131 generates the high band signal SH1 by adding the signal which is outputted from the multiplication unit 112p.

Figure 7:
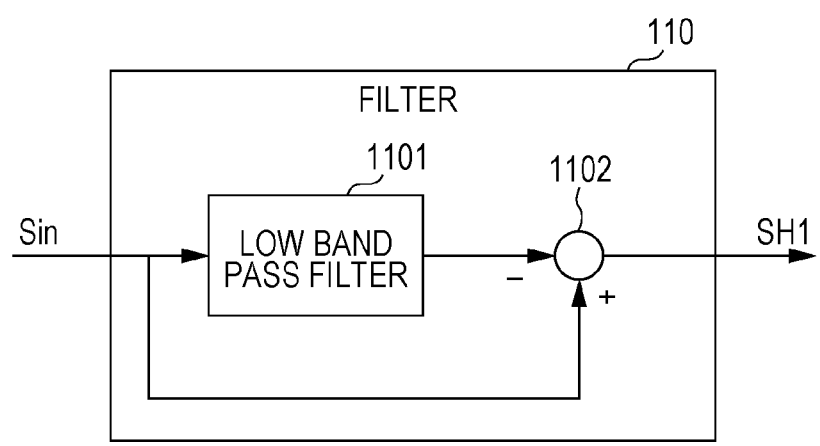
FIG. 7 is a block diagram illustrating another configuration example of a filter which is included in a high-frequency component extracting unit illustrated in FIG. 6.
Figure 8:
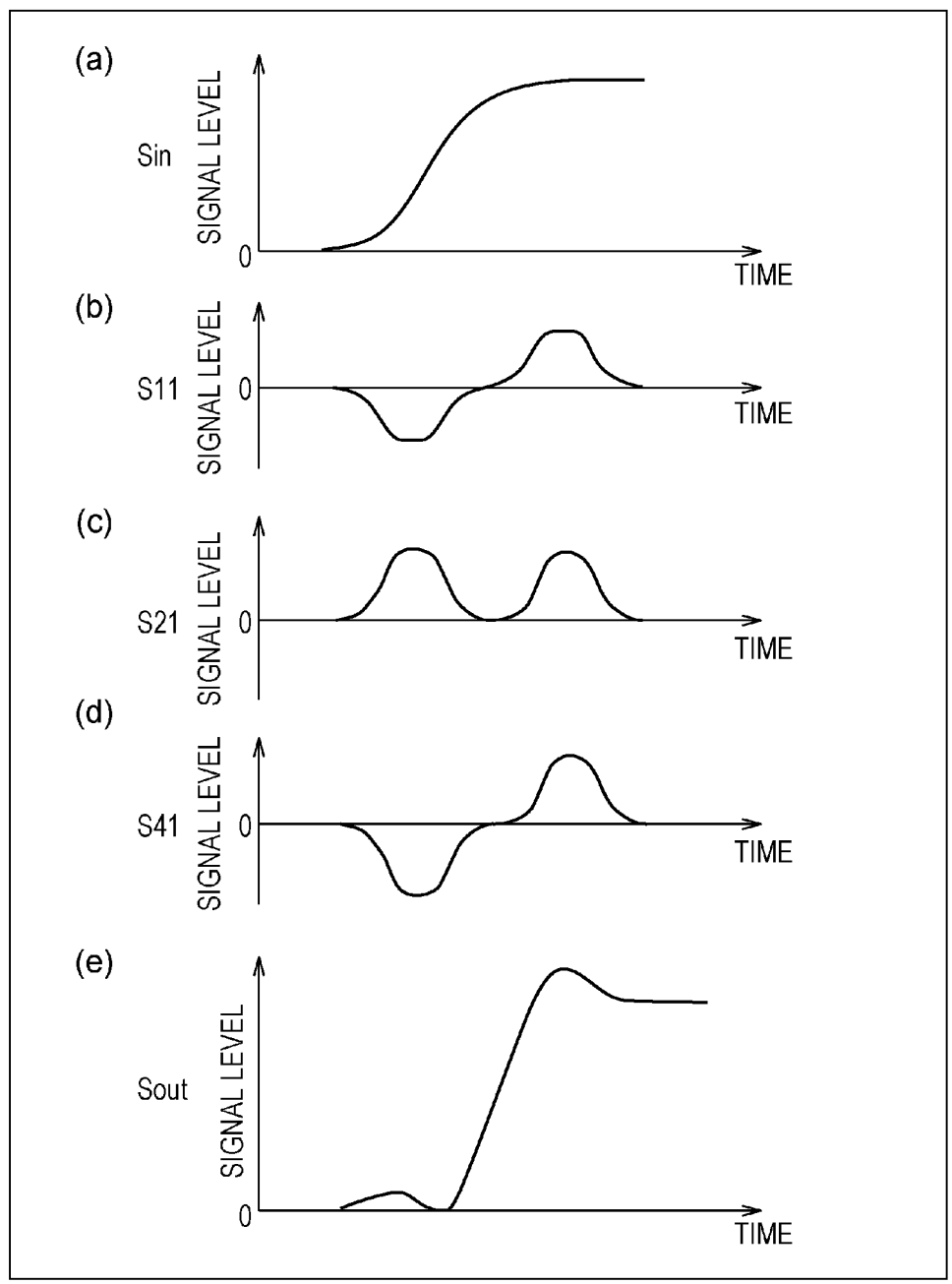
FIG. 8(a) is a pattern diagram illustrating a waveform of a signal which is inputted to the sharpening processing portion illustrated in FIG. 5.
FIG. 8(b) is a pattern diagram illustrating a waveform of a high-frequency signal generated by the sharpening processing portion illustrated in FIG. 5.
FIG. 8(c) is a pattern diagram illustrating a waveform of a nonlinear signal generated by the sharpening processing portion illustrated in FIG. 5.
FIG. 8(d) is a pattern diagram illustrating a waveform of a signsign transformation signal generated by the sharpening processing portion illustrated in FIG. 5.
FIG. 8(e) is a pattern diagram illustrating a waveform of an output signal generated by the sharpening processing portion illustrated in FIG. 5.

In addition, as generally known, the low band pass filter can be implemented more easily than the high band pass filter. So, the filter 110 may be configured by using the low band pass filter. In FIG. 7, another configuration example of the filter 110 is illustrated. As illustrated in the same figure, the filter 110 may be configured by a low band pass filter 1101 and a subtraction unit 1102.

In order not to amplify noise in a nonlinear processing unit 102 in a rear stage, the rounding processing unit 132 generates a low level removal signal SH2 by removing the low level signal SH1 which is regarded as noise included in the high band signal SH1.

Specifically, the low level removal signal SH2 is generated by converting a signal value with an absolute value equal to or less than a predetermined lower limit value LV into "0", among the signal values of the high band signal SH1.

For example, in a case where the input signal Sin can take an integer value of any number of −255 to 255, when the lower limit value LV is set to "2", the signal values with the absolute value equal to or less than "2" among the signal values of the high band signal SH1 are all regarded as noise and then converted into "0" (that is, rounded off).

Next, in order not to further amplify a signal having sufficient energy already in the nonlinear processing unit 102 in the rear stage, the limiter 133 generates the high-frequency signal S11 by removing the high level signal value included in the low level removal signal SH2.

Specifically, in order to make the signal value of the low level removal signal SH2 equal to or less than a predetermined upper limit value UV1, the processing (hereinafter, also referred to as a clip processing) which converts the absolute value into a value equal to or less than the upper limit value UV1 is performed, with regard to a portion with the absolute value greater than the upper limit value UV1, among the signals of the low level removal signal SH2, thereby generating the high-frequency signal S11.

For example, with regard to a portion in which the absolute value of the signal value of the low level removal signal SH2 exceeds "64", the signal value of the related portion is converted into "64" or "−64" according to a signsign. Alternatively, the related portion of the signal value may be converted into "0".

In addition, in a case where the input signal Sin is a 8-bit signal, in the above-described filter 110, with regard to the 8-bit signal, a signal which is limited to be equal to or less than a third MSB (about 64 or −64 by 8-bit signal) using 12-bit calculation is added to the input signal Sin, for example. For this reason, the rounding processing unit 132 and the limiter 133 perform the processing limited to 8-bit signal equivalency with regard to the calculation results performed by the filter 110.

In addition, in the above description, the high-frequency component extracting unit 11 is configured to have the rounding processing unit 132 and the limiter 133, respectively, but may be configured to have a member in which the rounding processing unit 132 and the limiter 133 are integrated.

Next, the nonlinear processing unit 102a will be described. As illustrated in FIG. 5, the nonlinear processing unit 102a includes a nonlinear calculation unit (even exponentiation calculation means, square root calculation means) 21, a signsign transformation unit (signsign transformation means) 41 and a limiter (amplitude adjusting means) 51.

The nonlinear calculation unit 21 performs the nonlinear calculation with respect to a high-frequency signal S11, and generates a nonlinear signal S21.

Here, the nonlinear calculation which is performed in the nonlinear calculation unit 21 will be described. Hereinafter, an input signal value to the nonlinear calculation unit 21 is represented as x, an output signal value from the nonlinear calculation unit 21 is represented as y, and the nonlinear calculation which is performed in the nonlinear calculation unit 21 is represented by a function which is y=f(x).

Here, it is assumed that the function f(x) is a nonlinear function which is monotonically increased in positive and negative symmetry (origin symmetry). In addition, the monotonically increase means that of a broad sense. However, the function f(x) may be monotonically increased in the vicinity of at least x="0". In addition, it is preferred that the function f(x) is |f(x)|>|x| in the vicinity of at least x="0".

As such a function f(x), there are examples represented by the following equations (1) to (3). In addition, in a case where the function f(x) represented by the following equations (2) and (3) is used, it is preferred that the related function f(x) is used at the related section because the value at the section of $0 \leq x \leq 1$ greatly increase.

[Equation 1]

$$f(x)=x^n \text{ (}n\text{ is a natural number)} \quad (1)$$

[Equation 2]

$$f(x)=|x|^{1/2} \quad (2)$$

[Equation 3]

$$f(x)=|x|^{1/10} \quad (3)$$

In a case where the above-described equation (1) is used as the function f(x), the nonlinear calculation unit 21 generates the nonlinear signal S21 (even exponentiated signal, square root signal) by exponentiating the high-frequency signal S11 by using an even number of two or greater as an exponent. For example, in a case where n=1 in the above-described equation (1) (that is, a case where f(x)=x2), the nonlinear calculation unit 21 generates the nonlinear signal S21 by squaring the high-frequency signal S11. In this case, if a data string which configures the high-frequency signal S11 is X1, X2, X3, . . . , the nonlinear signal S21 obtained by squaring the high-frequency signal S11 becomes a digital signal which is configured by a data string which is $X1^2, X2^2, X3^2, \ldots$.

Incidentally, in a case where the signal value of the high-frequency signal S11 is an integer value of any number of −255 to 255, in using the function f(x), x may be normalized by 255. For example, instead of using the above-described equation (2), x in the right side of the function f(x) represented by the above-described equation (2) is normalized by x/255, and the following equation (4) in which the right side is multiplied by 255 may be used. In addition, the following equation (4) satisfies the condition of f(x)>x.

[Equation 4]

$$f(x)=255|x/255|^{1/2} \quad (4)$$

In the above-described equation (4), x in the right side of the function f(x) represented by the above-described equation (2) is normalized by 255, and the right side is multiplied by 255, but the number value which multiplies the right side is not required to be the same value as the value (255 in this example) for normalizing, and may satisfy the condition which is |f(x)|>|x|. For example, the following equation (5) in which the right side is multiplied by 100 instead of 255 may be used.

[Equation 5]

$$f(x)=100|x/255|^{1/2} \quad (5)$$

In addition, the function f(x) may use a trigonometric function represented by the following equation (6).

[Equation 6]

$$f(x)=255|\sin\{(x/255)(\pi/2)\}| \quad (6)$$

Next, based on sign bit information of the high-frequency signal S11, the sign transformation unit 41 generates as a sign transformation signal S41 something in which the sign of the high-frequency signal S11 is reflected to the nonlinear signal S21. That is, the sign transformation unit 41 preserves the sign as it is in a portion in which the sign is the same as the high-frequency signal S11, among the nonlinear signals S21. On the other hand, in a portion in which the sign is different from the high-frequency signal S11 among the nonlinear signals S21, signs thereof are inverted.

Next, a limiter 51 generates a nonlinearly processed signalnonlinearly processed signal S12 (horizontal nonlinearly processed signalnonlinearly processed signal, vertical nonlinearly processed signalnonlinearly processed signal, time nonlinearly processed signalnonlinearly processed signal) by performing the processing (hereinafter, referred to as amplitude adjustment processing) which adjusts an amplitude (signal level, intensity) of the sign transformation signal S41 generated by the sign transformation unit 41. Specifically, the limiter 51 adjusts the amplitude of the sign transformation signal S41 by multiplying the sign transformation signal S41 by a predetermined magnification value α (|α|<1) (first to fourth predetermined magnification values).

In addition, it is desirable that the magnitude value α can be appropriately set depending on a motion in the image and a noise amount. In addition, in a case where the magnitude value α is set to a fixed value, for example, it is preferable that the absolute value be set to a value of 0.5 or less.

Further, in order not to further amplify the signal having sufficient energy already, the limiter 51 performs the processing (hereinafter, referred to as clip processing) which changes the absolute value equal to or less than the related upper limit value UV2, with respect to a portion in which the absolute value is greater than the upper limit value UV2, among the signals of the nonlinearly processed signalnonlinearly processed signal S12, so that the signal value of the nonlinearly processed signalnonlinearly processed signal S12 becomes a predetermined upper limit value UV2 or less. For example, with respect to a portion in which the absolute value of the signal value of the nonlinearly processed signalnonlinearly processed signal S12 exceeds "64", the signal value of the related portion is changed from "64" or "−64" depending on the sign. Alternatively, the signal value may be changed to "0".

In addition, the nonlinear processing unit 102a, without the limiter 51, may be configured not to perform an amplitude adjustment processing of the sign transformation signal S41 and the clip processing. In this case, the sign transformation signal S41 which is generated by the sign transformation unit 41 is outputted from the nonlinear processing unit 102a as the nonlinearly processed signalnonlinearly processed signal S12.

Finally, an addition unit 15 will be described. The addition unit 15 generates the output signal Sout, by adding the nonlinearly processed signal S12 as a compensating signal to the input signal Sin. In addition, in the addition unit 15, delay elements for adjusting timing between the input signal Sin and the nonlinearly processed signal S12 are appropriately included.

Signal Waveform in Configuration Example 1

Next, with reference to FIGS. 8(a) to 8(e), a signal waveform which is generated by each unit of the sharpening processing portion 100a will be described. FIGS. 8(a) to 8(e) are pattern diagrams illustrating the signal waveforms which are generated by each portion of the sharpening processing portion 100a. Here, the signal illustrated in FIG. 8(a) is a signal which is inputted to the sharpening processing portion 100a as the input signal Sin.

First, when the input signal Sin is inputted to the high-frequency component extracting unit 11, the high-frequency components included in the input signal Sin are extracted, and the high-frequency signal S11 illustrated in FIG. 8(b) is generated.

Subsequently, in a case where the nonlinear calculation which is performed in the nonlinear calculation unit 21 of the nonlinear processing unit 102a is $f(x)=x^2$, the nonlinear signal S21 obtained by squaring the high-frequency signal S11 is generated by the nonlinear calculation unit 21 (refer to FIG. 8(c)).

Subsequently, when the nonlinear signal S21 is inputted to the sign transformation unit 41, the sign transformation signal S41 illustrated in FIG. 8(d) is generated. As illustrated in the same figure, the sign transformation signal S41 preserves the sign of the high-frequency signal S11 illustrated in FIG. 8(b).

Subsequently, when the sign transformation signal S41 is inputted to the limiter 51, an amplitude adjustment processing and the clip processing are performed, and the nonlinearly processed signal S12 is generated. Thereafter, when the nonlinearly processed signal S12 is added to the input signal Sin by the addition unit 15, the output signal Sout is generated (refer to FIG. 8(e)).

Figure 9:
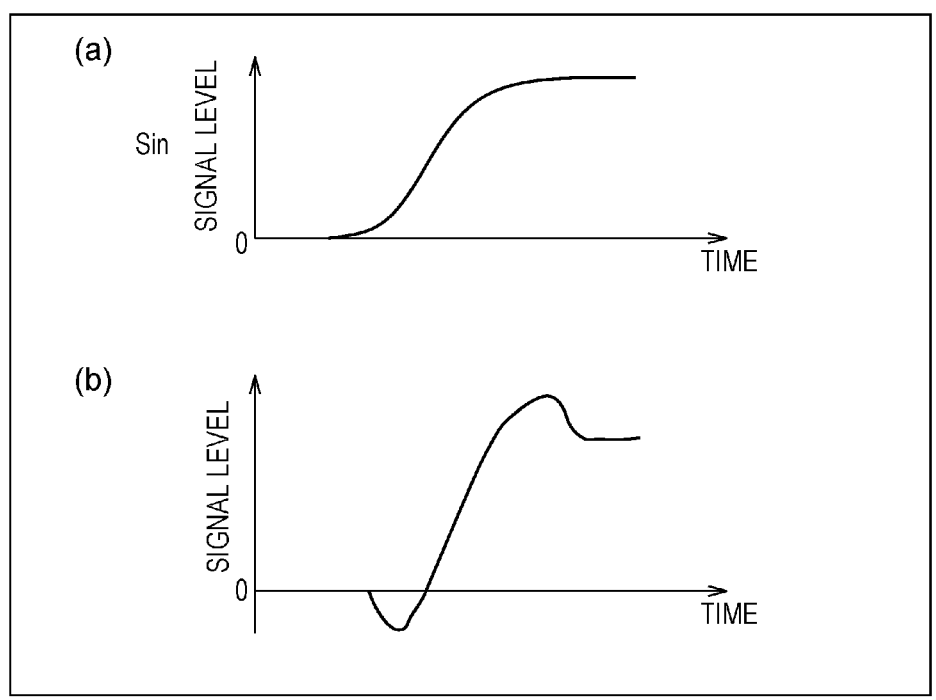
FIG. 9(a) is a pattern diagram illustrating a waveform of a signal which is inputted to the sharpening processing portion illustrated in FIG. 5.
FIG. 9(b) is a pattern diagram illustrating a waveform which enhances the signal illustrated in FIG. 9(a) using related arts.

In addition, the rising and falling of the signal in the nonlinearly processed signal S12 illustrated in FIG. 8(e) is steepened more greatly than the rising and falling of the signal, in a case where the input signal Sin is enhanced by using the linear calculation, and it will be described with reference to FIG. 9.

A signal illustrated in FIG. 9(a) is the same as the input signal Sin illustrated in FIG. 8(a). Then, in a case where the input signal Sin illustrated in FIG. 9(a) is enhanced, in the sharpening processing using the linear calculation, the high band signal is extracted from the input signal Sin illustrated in FIG. 9(a), and a method in which the input signal Sin is added to the extracted high band signal is used. Therefore, in the sharpening processing using the linear processing, the signal components beyond the Nyquist frequency which is not included in the input signal Sin are not added.

For this reason, in the sharpening processing using the linear calculation, the signal illustrated in FIG. 9(b) is generated. The rising in the signal illustrated in FIG. 9(b) is steepened more greatly than the rising of the signal in the input signal Sin illustrated in FIG. 9(a), but the rising side of the signal in the nonlinearly processed signal S12 (FIG. 8(e)) which is generated by the sharpening processing portion 100a is steepened more greatly.

Configuration Example 2 of Sharpening Processing Portion

The above-described nonlinear processing unit 102a may be configured to differentiate the nonlinear signal S21 which is generated by the nonlinear calculation unit 21. This is because direct current components which are included in the nonlinear signal S21 can be removed, by differentiating the nonlinear signal S21.

Figure 10:
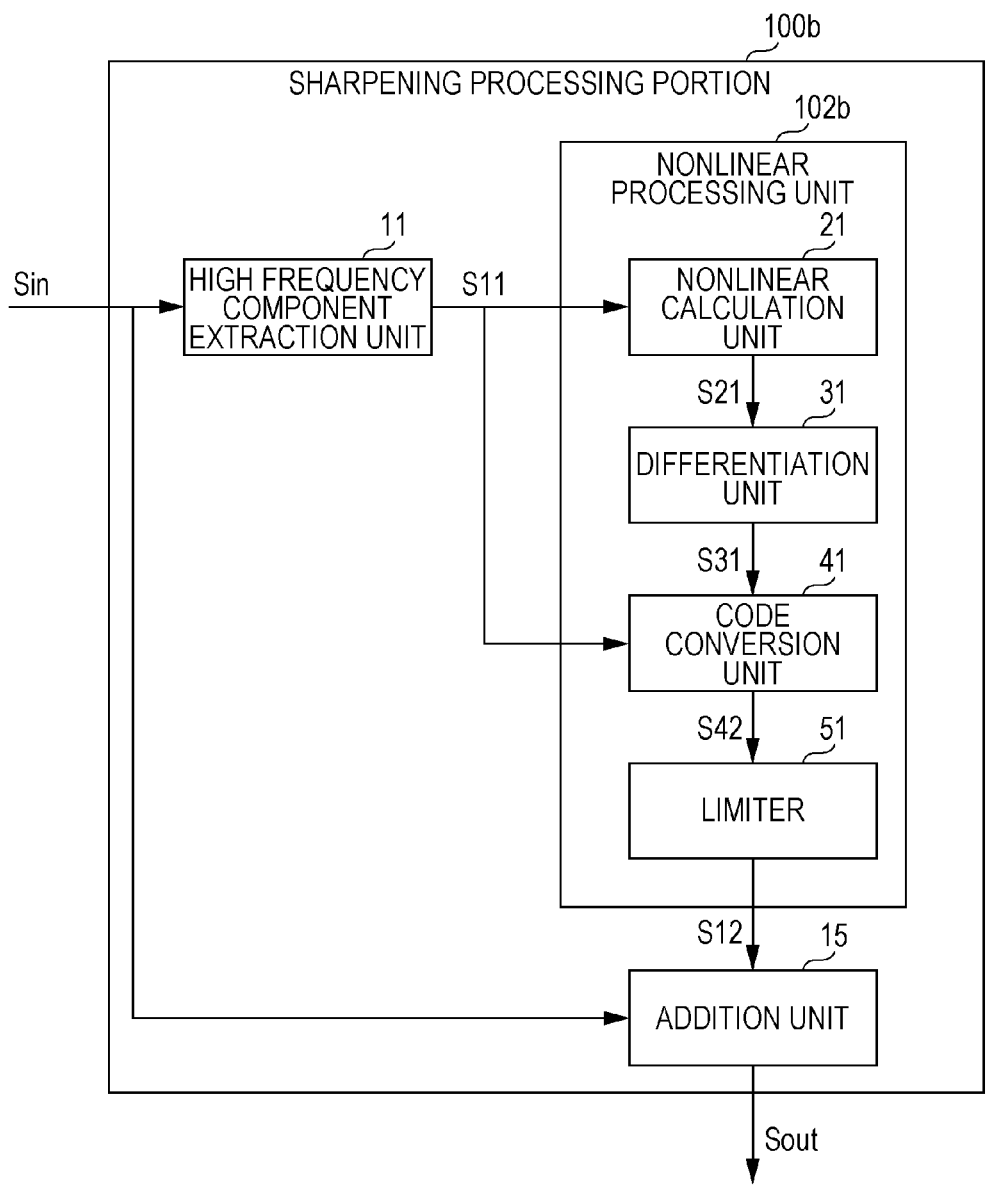
FIG. 10 is a block diagram illustrating another configuration of the sharpening processing portion which is included in the signal processing device according to the present invention.

So, with reference to FIG. 10, a configuration example of a sharpening processing portion 100b will be described. FIG. 10 is a block diagram illustrating a configuration of the sharpening processing portion 100b.

As illustrated in the same figure, the sharpening processing portion 100b includes the high-frequency component extracting unit 11, a nonlinear processing unit 102b and the addition unit 15. Then, in addition to the configuration of the nonlinear processing unit 102a illustrated in FIG. 5, the nonlinear processing unit 102b includes a differentiation unit (differentiation means) 31 between the nonlinear calculation unit 21 and the sign transformation unit 41. Since the high-frequency component extracting unit 11, units except the differentiation unit 31 of the nonlinear processing unit 102b, and the addition unit 15 are the same as those described above, the detailed description thereof will not be repeated here.

The differentiation unit 31 generates a differentiated signal S31 by differentiating the nonlinear signal S21 which is generated by the nonlinear calculation unit 21.

Figure 11:
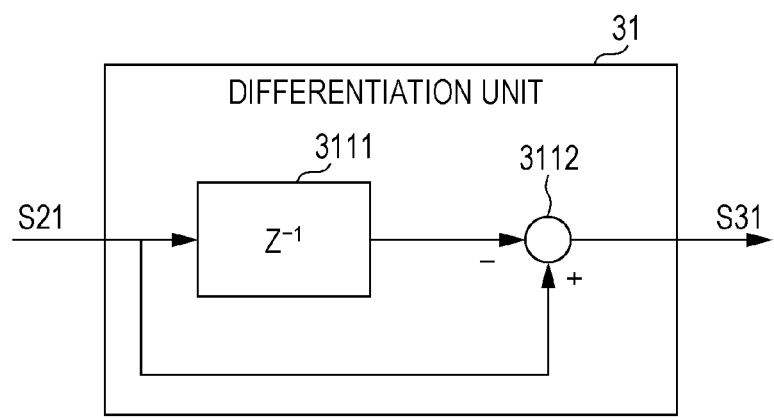
FIG. 11 is a block diagram illustrating a configuration of a differentiating unit which is included in the sharpening processing portion illustrated in FIG. 10.
Figure 12:
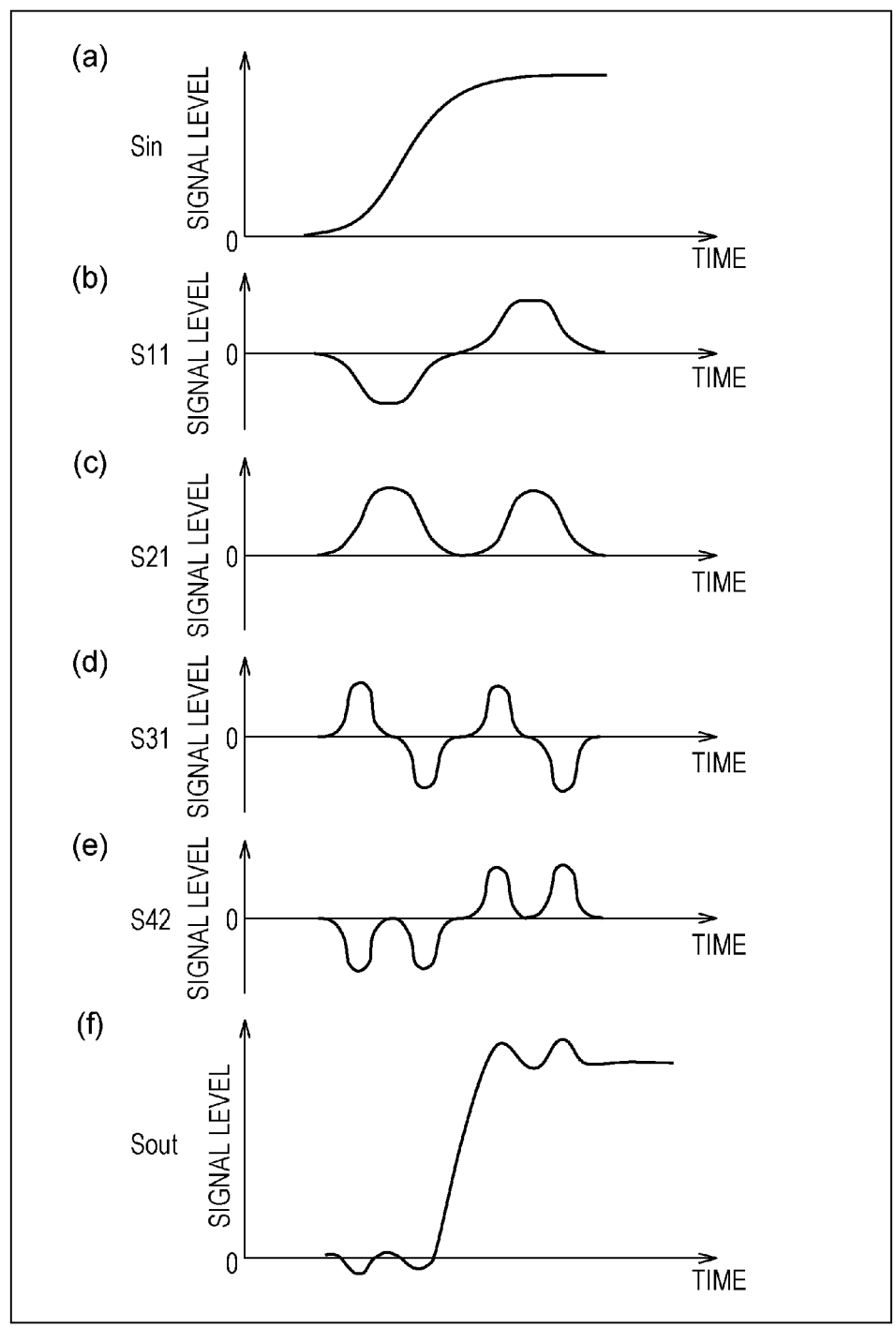
FIG. 12(a) is a pattern diagram illustrating a waveform of a signal which is inputted to the sharpening processing portion illustrated in FIG. 10.
FIG. 12(b) is a pattern diagram illustrating a waveform of a high-frequency signal generated by the sharpening processing portion illustrated in FIG. 10.
FIG. 12(c) is a pattern diagram illustrating a waveform of a nonlinear signal generated by the sharpening processing portion illustrated in FIG. 10.
FIG. 12(d) is a pattern diagram illustrating a waveform of a differentiated signal generated by the sharpening processing portion illustrated in FIG. 10.
FIG. 12(e) is a pattern diagram illustrating a waveform of a signsign transformation signal generated by the sharpening processing portion illustrated in FIG. 10.
FIG. 12(f) is a pattern diagram illustrating a waveform of an output signal generated by the sharpening processing portion illustrated in FIG. 10.

With reference to FIG. 11, a configuration of the differentiation unit 31 will be described. FIG. 11 is block diagram illustrating the configuration of the differentiation unit 31. As illustrated in the same figure, the differentiation unit 31 is configured to have a unit delay element 3111 and a subtraction unit 3112, and calculates a backward difference with respect to a signal which is inputted to the differentiation unit 31.

Then, with respect to the differentiated signal S31 which is generated by the differentiation unit 31, the sign transformation unit 41 generates as a sign transformation signal S42 a thing in which the sign of the high-frequency signal S11 is reflected in the nonlinear signal S21 based on sign bit information of the high frequency signal S11. That is, the sign transformation unit 41 preserves the sign as it is, with respect to a portion in which the sign is the same as the high-frequency signal S11, among the differentiated signal s S31. On the other hand, the sign is inverted with respect to a portion in which the sign is different from the high-frequency signal S11, among the nonlinear signals S21.

Then, the limiter 51 generates the nonlinearly processed signal S12 by performing the amplitude adjustment processing and the clip processing, with respect to the sign transformation signal S42 which is generated by the sign transformation unit 41. In the amplitude adjustment processing, the amplitude of the sign transformation signal S42 is adjusted by multiplying the sign transformation signal S42 using a predetermined magnitude value α.

In addition, the nonlinear processing unit 102b may be configured not to perform the amplitude adjustment processing of the sign transformation signal S42 and the clip processing, without the limiter 51. In this case, the sign transformation signal S42 which is generated by the sign transformation unit 41 is outputted from the nonlinear processing unit 102b as the nonlinearly processed signal S12.

Signal Waveform in Configuration Example 2

Next, with reference to FIGS. 12(a) to 12(f), signal waveforms which are generated by each unit of the sharpening processing portion 100b will be described. FIGS. 12(a) and 12(f) are pattern diagrams illustrating signal waveforms which are generated by each unit of the sharpening processing portion 100b. Here, the signal illustrated in FIG. 12(a) is inputted to the sharpening processing portion 100b as the input signal Sin. In addition, the signal illustrated in FIG. 12(a) is the same as the signal illustrated in FIG. 8(a).

First, when the input signal Sin is inputted to the high-frequency component extracting unit 11, the high-frequency components included in the input signal Sin are extracted, and the high-frequency signal S11 illustrated in FIG. 12(b) is generated.

Subsequently, in a case where the nonlinear calculation which is performed in the nonlinear calculation unit 21 of the nonlinear processing unit 102b is that $f(x)=x^2$, the nonlinear signal S21 obtained by multiplying the high-frequency signal S11 by 2 is generated by the nonlinear calculation unit 21 (refer to FIG. 12(c)).

Subsequently, when the nonlinear signal S21 is inputted to the differentiation unit 31, the differentiated signal S31 illustrated in FIG. 12(d) is generated. In addition, in the differentiated signal S31, the direct current components which are included in the nonlinear signal S21 are removed.

Subsequently, when the differentiated signal S31 is inputted to the sign transformation unit 41, the sign transformation signal S42 illustrated in FIG. 12(e) is generated. As illustrated in the same figure, the sign transformation signal S42 preserves the sign of the high-frequency signal S11 illustrated in FIG. 12(b).

Subsequently, when the sign transformation signal S41 is inputted to the limiter 51, the amplitude modulation processing and the clip processing are performed, and the nonlinearly processed signal S12 is generated. Finally, when the nonlinearly processed signal S12 is added to the input signal Sin by the addition unit 15, the output signal Sout is generated (refer to FIG. 12(f)).

In addition, the rising and falling of the signal in the output signal Sout illustrated in FIG. 12(f) is steepened more greatly than that in a case where the sharpening is performed by using the linear calculation.

Configuration Example 3 of Sharpening Processing Portion

In the configuration of the above-described nonlinear processing unit 102a and nonlinear processing unit 102b, the sign transformation unit 41 is included, but if the nonlinear calculation preserves the sign of the high-frequency signal S11, the sign transformation unit 41 is not required.

Figure 13:
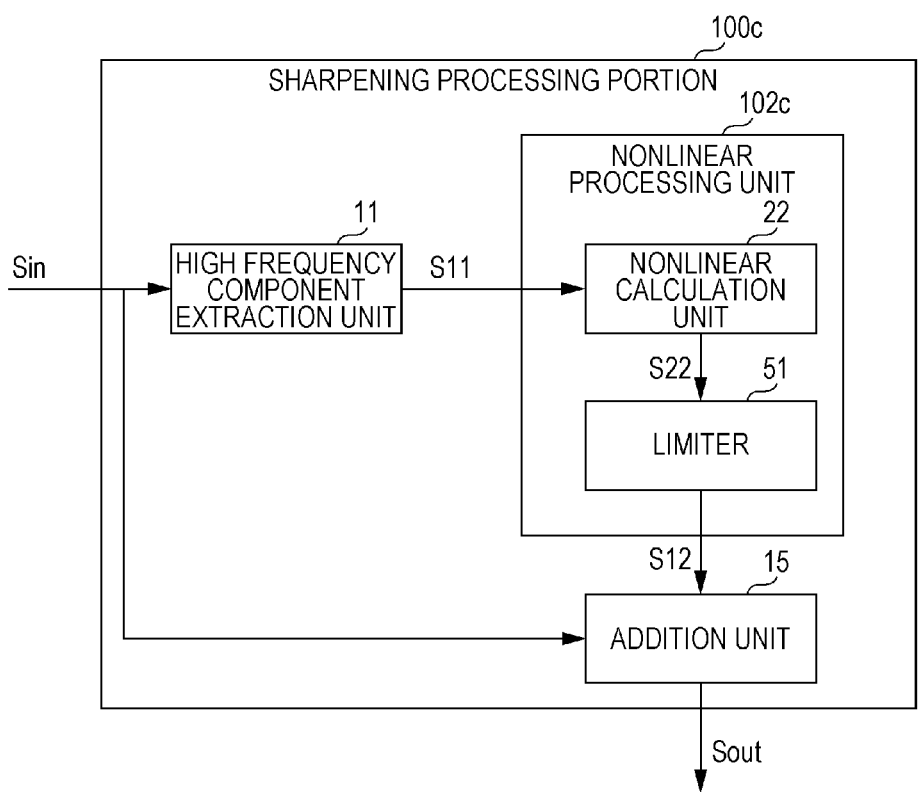
FIG. 13 is a block diagram illustrating still another configuration of the sharpening processing portion which is included in the signal processing device according to the present invention.
Figure 14:
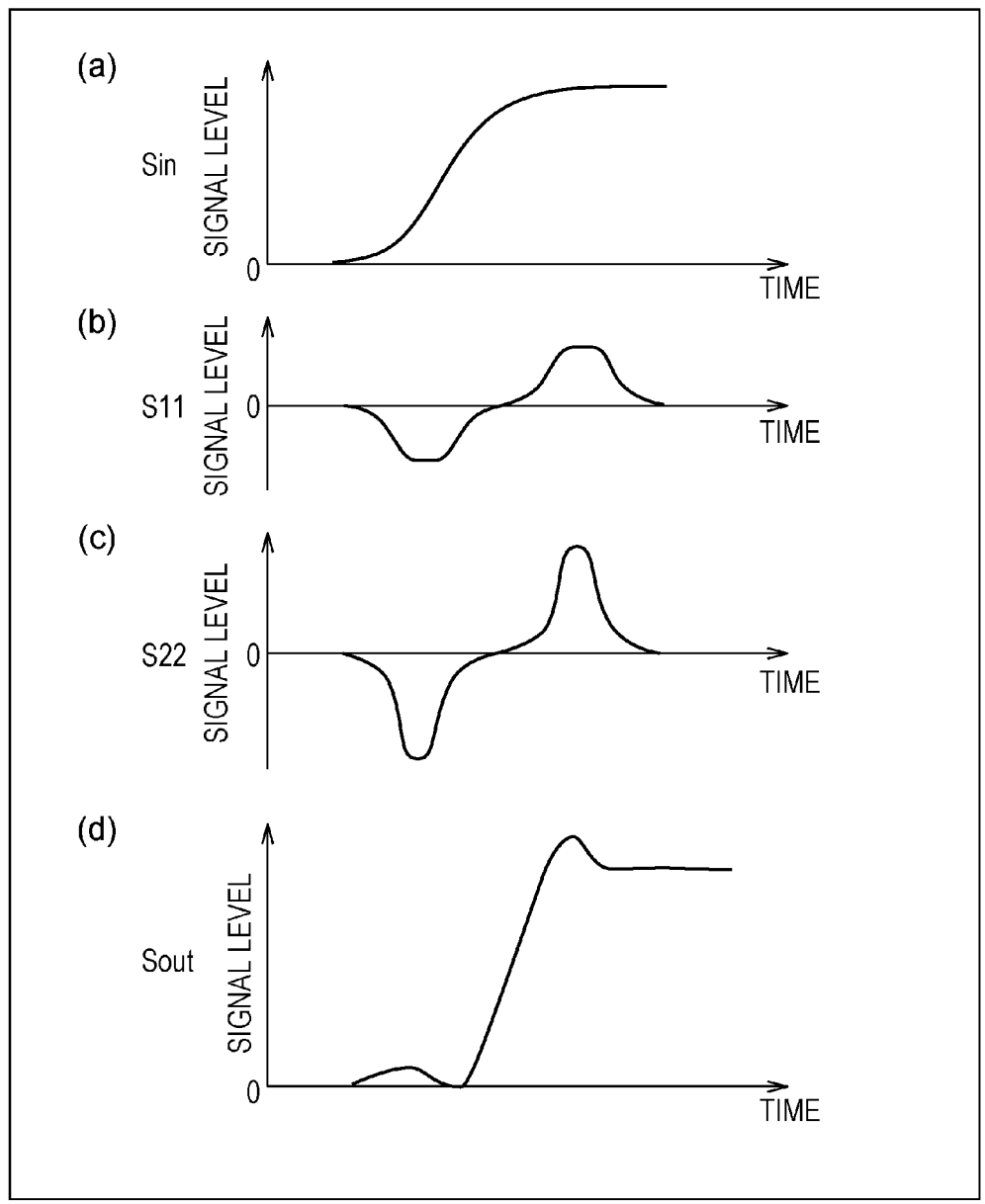
FIG. 14(a) is a pattern diagram illustrating a waveform of a signal which is inputted to the sharpening processing portion illustrated in FIG. 13.
FIG. 14(b) is a pattern diagram illustrating a waveform of a high-frequency signal generated by the sharpening processing portion illustrated in FIG. 13.
FIG. 14(c) is a pattern diagram illustrating a waveform of a nonlinear signal generated by the sharpening processing portion illustrated in FIG. 13.
FIG. 14(d) is a pattern diagram illustrating a waveform of an output signal generated by the sharpening processing portion illustrated in FIG. 13.

So, with reference to FIG. 13, a configuration example of a sharpening processing portion 100c which does not include the sign transformation unit 41 will be described. FIG. 13 is a block diagram illustrating a configuration of the sharpening processing portion 100c.

As illustrated in the same figure, the sharpening processing portion 100c includes the high-frequency component extracting unit 11, a nonlinear processing unit 102c and the addition unit 15. Then, the nonlinear processing unit 102c includes the nonlinear calculation unit (odd exponential calculation means) 22 and the limiter 51. Since the high-frequency component extracting unit 11, the limiter 51 and the addition unit 15 are the same as those described above, the detailed description thereof will not be repeated here.

The nonlinear calculation unit 22 performs the nonlinear calculation with respect to the high-frequency signal S11, and generates the nonlinear signal S22.

Here, the nonlinear calculation which is performed in the nonlinear calculation unit 22 will be described. Hereinafter, an input signal value to the nonlinear calculation unit 22 is set to x, an output signal value from the nonlinear calculation unit 22 is set to y, and a nonlinear calculation which is performed in the nonlinear calculation unit 22 is represented by a function that $y=g(x)$.

Here, it is assumed that the function $g(x)$ is the nonlinear function which is monotonically increased in positive and negative symmetry (origin symmetry). In addition, the monotonically increase means that in a broad sense. However, the function $g(x)$ may be monotonically increased in the vicinity of at least $x="0"$. In addition, it is preferred that the function $g(x)$ is $|g(x)|>|x|$ in the vicinity of at least $x="0"$.

As such a function $g(x)$, there is the following equation (7), for example.

[Equation 7]

$$g(x)=x^{3n} \ (n \text{ is a natural number}) \qquad (7)$$

In a case where the above-described equation (7) is used as the function $g(x)$, the nonlinear calculation unit 22 generates the nonlinear signal S22 by exponentiating the high-frequency signal S11 by using an odd number of three or greater as the exponent. For example, in a case where $n=1$ in the above-described equation (7) (that is, a case where $g(x)=x^3$), the nonlinear calculation unit 22 generates the nonlinear signal S22 by cubing the high-frequency signal S11. In this case, if a data string which configures the high-frequency signal S11 is $X1, X2, X3, \ldots$, the nonlinear signal S22 obtained by cubing the high-frequency signal S11 becomes a digital signal which is configured by a data string which is a data string $X1^3, X2^3, X3^3, \ldots$.

Then, the limiter 51 performs the amplitude adjustment processing and the clip processing with respect to the nonlinear signal S22 which is generated by the nonlinear calculation unit 22, thereby generating a nonlinearly processed signal S12.

In addition, the nonlinear processing unit 102c, without the limiter 51, may be configured not to perform the amplitude adjustment processing of the nonlinear signal S22 and the clip processing. In this case, the nonlinear signal S22 which is generated by the nonlinear calculation unit 22 is outputted from the nonlinear processing unit 102c as the nonlinearly processed signal S12.

Signal Waveform in Configuration Example 3

Next, with reference to FIGS. 14(a) to 14(d), signal waveforms which are generated by each unit of the sharpening processing portions 100c will be described. FIGS. 14(a) to 14(d) are pattern diagrams illustrating signal waveforms which are generated by each unit of the sharpening processing portions 100c. Here, the signal illustrated in FIG. 14(a) is inputted to the sharpening processing portion 100c as the input signal Sin. In addition, the signal illustrated in FIG. 14(a) is the same as the signal illustrated in FIG. 8(a).

First, when the input signal Sin is inputted to the high-frequency component extracting unit 11, the high-frequency components included in the input signal Sin are extracted, and the high-frequency signal S11 illustrated in FIG. 14(b) is generated.

Subsequently, in a case where the nonlinear calculation which is performed in the nonlinear calculation unit 22 is $f(x)=x^3$, the nonlinear signal S22 obtained by multiplying the high-frequency signal S11 by 3 is generated by the nonlinear calculation unit 22 (refer to FIG. 14(c)).

Subsequently, when the nonlinear signal S22 is inputted to the limiter 51, the amplitude modulation processing and the clip processing are performed, and the nonlinearly processed signal S12 is generated. Finally, when the nonlinearly processed signal S12 is added to the input signal Sin by the addition unit 15, the output signal Sout is generated (refer to FIG. 14(d)).

In addition, the rising and falling of the signal in the output signal Sout illustrated in FIG. 14(d) is steepened more greatly than that in a case where the sharpening is performed by using the linear calculation.

(Reason of Frequency Generation beyond Nyquist Frequency)

Next, the reason why the output signal Sout which is generated by the sharpening processing portion 100A includes the high-frequency components which exceed the Nyfquist frequency fs/2 such as the high-frequency components having the input signal Sin will be described.

Here, the input signal Sin is represented by a function F(x) in which time is set to x. Then, if a basic angular frequency of the input signal Sin is set to ω, the function F(x) can be represented by Fourier series as represented by the equation (8).

[Equation 8]

$$F(x) = a_{-N}\cos(-N)\omega x + a_{-N+1}\cos(-N+1)\omega x + \ldots + a_{-1}\cos(-1)\omega x + a_0 + a_1\cos\omega x + a_2\cos 2\omega x + \ldots + a_N\cos N\omega x + b_{-N}\sin(-N)\omega x + b_{-N+1}\sin(-N+1)\omega x + \ldots + b_{-1}\sin(-1)\omega x + b_1\sin\omega x + b_2\sin 2\omega x + \ldots + b_N\sin N\omega x \quad (8)$$

Here, N is a harmonic order of the highest frequency without exceeding the Nyquist frequency fs/2, with respect to the Nyquist frequency fs. That is, the following equation (9) is satisfied.

[Equation 9]

$$N\omega/(2\pi) < fs/2 < (N+1)\omega/(2\pi) \quad (9)$$

Next, if a signal except for the direct current components a0 of the input signal Sin which is represented by the function F(x) is represented by G(x), G(x) is represented by the following equation (10).

[Equation 10]

$$G(x) = a_{-N}\cos(-N)\omega x + a_{-N+1}\cos(-N+1)\omega x + \ldots + a_{-1}\cos(-1)\omega x + a_1\cos\omega x + a_2\cos 2\omega x + \ldots + a_N\cos N\omega x + b_{-N}\sin(-N)\omega x + b_{-N+1}\sin(-N+1)\omega x + \ldots + b_{-1}\sin(-1)\omega x + b_1\sin\omega x + b_2\sin 2\omega x + \ldots + b_N\sin N\omega x \quad (10)$$

Here, the input signal Sin which is inputted to the sharpening processing portion 100A includes the signal G(x) or the harmonic components of the signal G(x).

Then, for example, in a case where the nonlinear calculation which is performed by the nonlinear calculation unit 21 is that $f(x)=x^2$, the nonlinear signal S21 which is generated by the nonlinear calculation unit 21 is a signal which is obtained by squaring the high-frequency signal S11. Here, by the above-described equation (10), each item of $(G(x))^2$ is represented by any one of the following equations (11) to (13) (i=±1, ±2, ... ±N; j=±1, ±2, ... +N).

[Equation 11]

$$a_i \cos i\omega x \cdot a_j \cos j\omega x \quad (11)$$

[Equation 12]

$$a_i \cos i\omega x \cdot b_j \sin j\omega x \quad (12)$$

[Equation 13]

$$b_i \sin i\omega x \cdot b_j \sin j\omega x \quad (13)$$

Here, by using a formula for a trigonometric function, the above-described equations (11) to (13) can be rewritten to the following equations (14) to (16), respectively.

[Equation 14]

$$(a_i a_j/2)\{\cos(i+j)\omega x + \cos(i-j)\omega x\} \quad (14)$$

[Equation 15]

$$(a_i a_j/2)\{\sin(i+j)\omega x - \sin(i-j)\omega x\} \quad (15)$$

[Equation 16]

$$(-b_i b_j/2)\{\cos(i+j)\omega x - \cos(i-j)\omega x\} \quad (16)$$

As can be seen from the above-described equations (14) to (16), $(G(x))^2$ includes the angular frequency components such as (N+1)ω, (N+2)ω, ..., 2Nω.

Thus, $(G(x))^2$ includes the frequency components higher than the Nyquist frequency fs/2. That is, the nonlinear signal S21 which is generated by the nonlinear calculation unit 21 includes the frequency components higher than the Nyquist frequency fs/2, such as harmonic components which are a frequency 2Nω/(2π).

Likewise, for example, in a case where the nonlinear calculation which is performed by the nonlinear calculation unit 22 is that $f(x)=x^3$, the nonlinear signal S22 which is generated by the nonlinear calculation unit 22 is a signal which is obtained by cubing the high-frequency signal S11. Here, according to the above-described equation (10), each item of $(G(x))^3$ is represented by any one of the following equations (17) to (20) (i=±1, ±2, ..., ±N; j=±1, ±2, ..., ±N; k=±1, ±2, ..., ±N).

[Equation 17]

$$a_i \cos i\omega x \cdot a_j \cos j\omega x \cdot a_k \cos k\omega x \quad (17)$$

[Equation 18]

$$a_i \cos i\omega x \cdot a_j \cos j\omega x \cdot b_k \sin k\omega x \quad (18)$$

[Equation 19]

$$a_i \cos i\omega x \cdot b_j \sin j\omega x \cdot b_k \sin k\omega x \quad (19)$$

[Equation 20]

$$b_i \sin i\omega x \cdot b_j \sin j\omega x \cdot b_k \sin k\omega x \quad (20)$$

Here, for example, when focusing on the items represented by the above-described equations (17) and (20) among the items in which i=j=k=N, these items can be rewritten to the following equations (21) and (22) by using the formula related to the trigonometric function.

[Equation 21]

$$(a_N \cos N\omega x)^3 = a_N^3\{(\tfrac{3}{4})\cos N\omega x + (\tfrac{1}{4})\cos 3N\omega x\} \quad (21)$$

[Equation 22]

$$(b_N \sin N\omega x)^3 = b_N^3\{(\tfrac{3}{4})\sin N\omega x - (\tfrac{1}{4})\sin 3N\omega x\} \quad (22)$$

In addition, for example, when focusing on the items represented by the above-described equations (17) and (20) among the items in which i=j=k=−N, these items can be rewritten to the following equations (23) and (24) by using the formula related to the trigonometric function.

[Equation 23]

$$\{a_N \cos(-N\omega x)\}^3 = a_N^3\{(\tfrac{3}{4})\cos(-N\omega x) + (\tfrac{1}{4})\cos(-3N\omega x)\} \quad (23)$$

[Equation 24]

$$\{b_N \sin(-N\omega x)\}^3 = b_N^3\{(\tfrac{3}{4})\sin(-N\omega x) - (\tfrac{1}{4})\sin(-3N\omega x)\} \quad (24)$$

As can be seen from the above-described equations (21) to (24), $(G(x))^3$ includes frequency components which are 3N times the basic angular frequency ω and frequency components which are −3N times the basic angular frequency ω. By rewriting using the trigonometric function formula, even with regard to other items of $(G(x))^3$, it can be seen that $(G(x))^3$ includes various frequency components from −3N times to 3N times the basic angular frequency ω.

Thus, $(G(x))^3$ includes the frequency components higher than the Nyquist frequency fs/2. That is, the nonlinear signal S22 which is generated by the nonlinear calculation unit 22 includes the frequency components higher than the Nyquist frequency fs/2, such as harmonic components which are a frequency 3Nω/(2π).

As described above, the output signal Sout which is generated by the sharpening processing portion 100A includes the high-frequency components which are not included in the input signal Sin, that is, the frequency components higher than the Nyquist frequency.

Another Configuration Example 1 of Sharpening Processing Portion

The nonlinear calculation which is performed in the sharpening processing portion 100A is considered variously besides the above-description. So, with reference to FIGS. 15 and 16, configuration examples of the sharpening processing portions 100d and 100e will be described.

Figure 15:
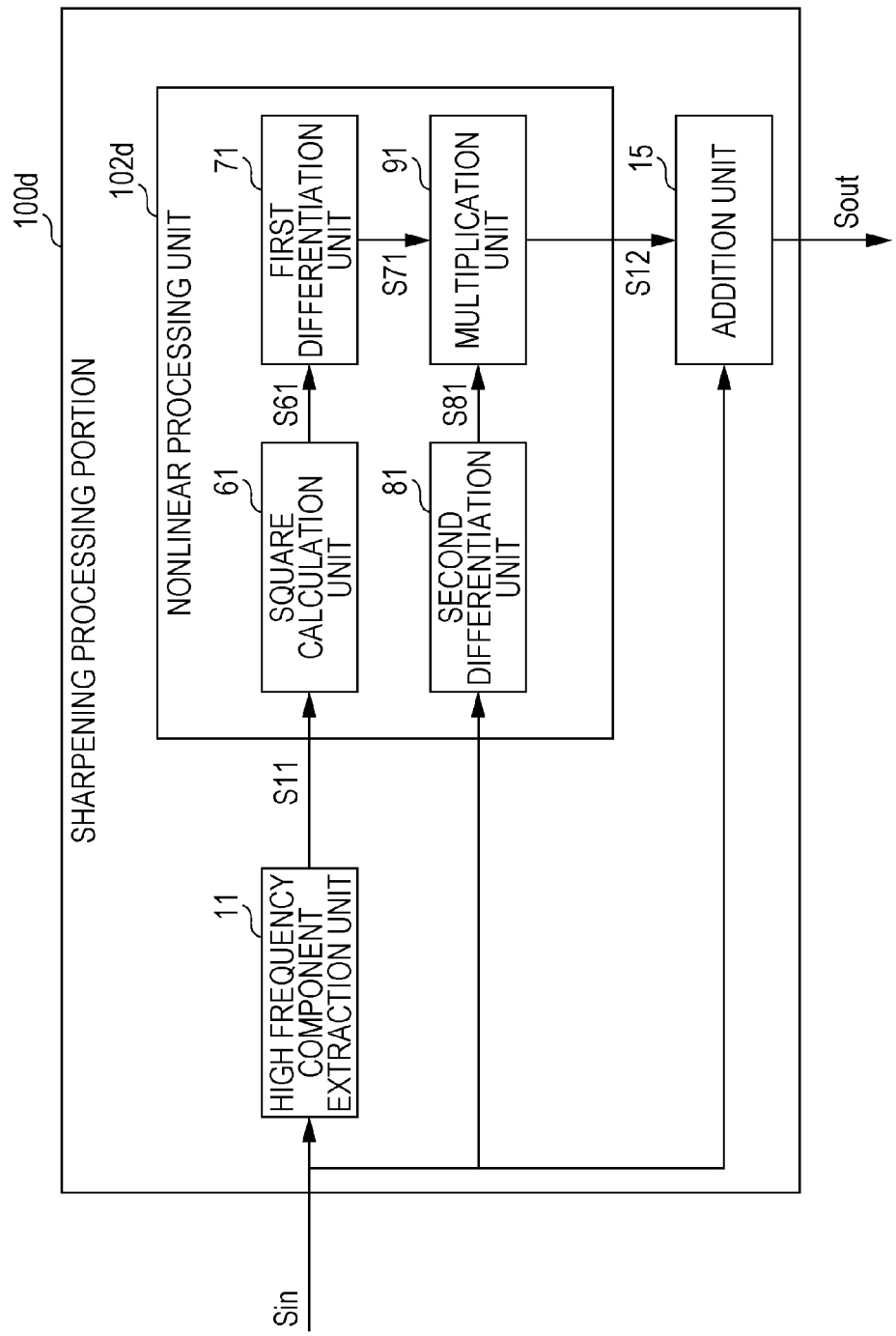
FIG. 15 is a block diagram illustrating still another configuration of the sharpening processing portion which is included in the signal processing device according to the present invention.

First, FIG. 15 is a block diagram illustrating the configuration of the sharpening processing portion 100d. As illustrated in the same figure, the sharpening processing portion 100d includes the high-frequency component extracting unit 11, a nonlinear processing unit 102d and the addition unit 15. Since the high-frequency component extracting unit 11 and the addition unit 15 are the same as those described above, the detailed description thereof will not be repeated here.

The nonlinear processing unit 102d includes a square calculation unit 61, a first differentiation unit 71, a second differentiation unit 81 and a multiplication unit 91.

The square calculation unit 61 generates a square signal S61 by squaring the high-frequency signal S11. That is, if the data string which configures the high-frequency signal S11 is X1, X2, X3, . . . , the square signal S61 which squares the high-frequency signal S11 is a digital signal which is configured by a data string which is a data string $X1^2$, $X2^2$, $X3^2$, . . . .

Next, the first differentiation unit 71 generates a first differentiated signal S71 by differentiating the square signal S61 which is generated by the square calculation unit 61. In addition, the configuration of the first differentiation unit 71 is the same as the differentiation unit 31, for example.

Next, the second differentiation unit 81 generates a second differentiated signal S81 by differentiating the input signal Sin. In addition, the configuration of the second differentiation unit 81 is the same as the differentiation unit 31, for example.

Then, the multiplication unit 91 generates the nonlinear signal S12 by multiplying the first differentiated signal S71 and the second differentiated signal S81. That is, if the data string which configures the first differentiated signal S71 is set to U1, U2, U3, . . . , and the data string which configures the second differentiated signal S81 is set to V1, V2, V3, . . . , the nonlinearly processed signal S12 becomes a digital signal which is configured by a data string which is U1·V1, U2·V2, U3·V3, . . . .

In addition, in the above-description, there is a configuration in which the square calculation unit 61 is installed so as to perform the nonlinear calculation, but instead of the square calculation unit 61, a biquadrate calculation unit which biquadrates the high-frequency signal S11 may be used. Moreover, generally, an exponentiation calculation unit which generates a signal corresponding to the exponentiation of the high-frequency signal S11 which uses two or greater even numbers as an exponent may be used.

Another Configuration Example 2 of Sharpening Processing Portion

In the configuration of the above-described sharpening processing portion 100d, there is a configuration in which the square calculation unit 61 is included, but instead of the square calculation unit 61, an absolute value processing unit 62 which calculates the absolute value of an incoming signal may be configured to be included.

Figure 16:
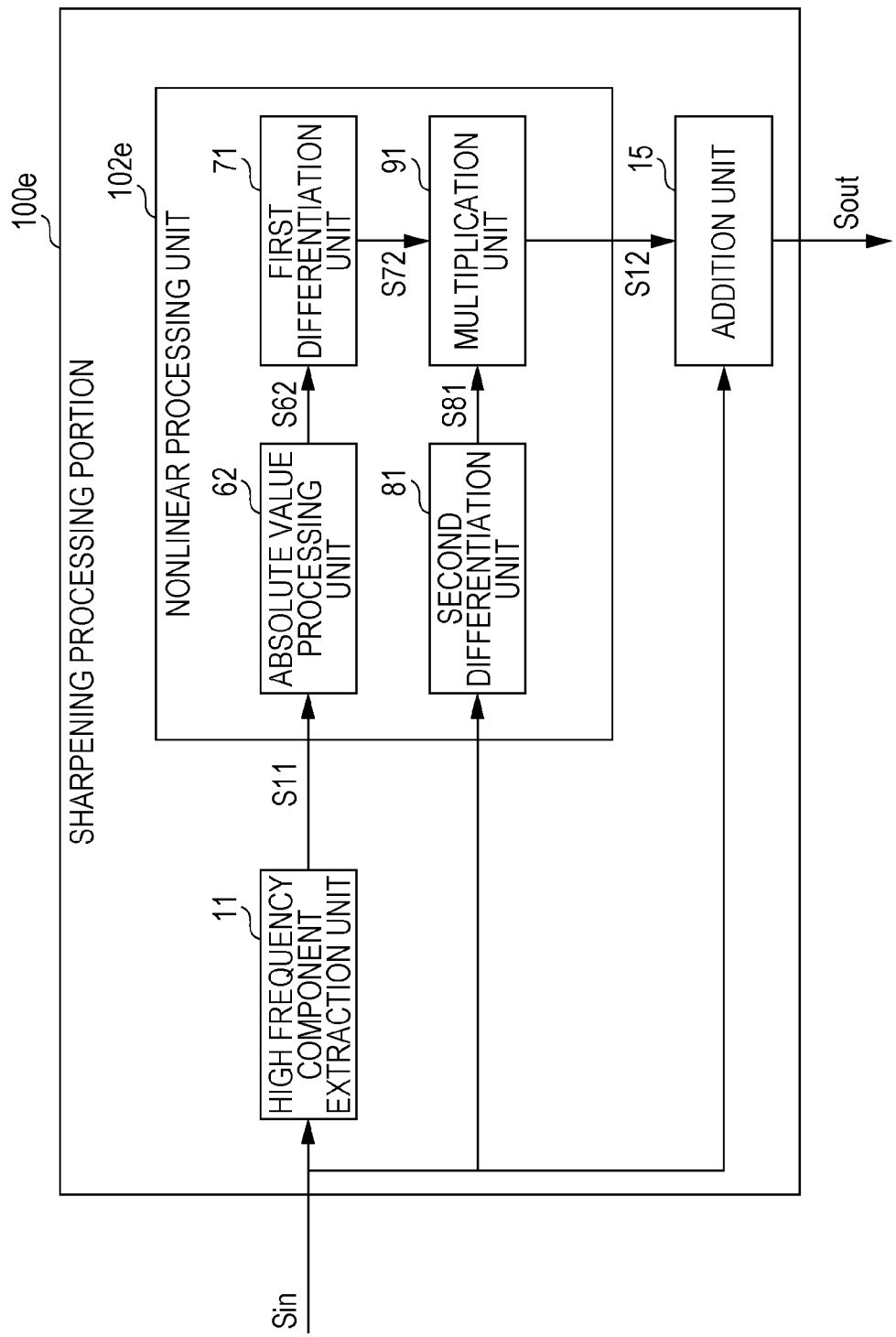
FIG. 16 is a block diagram illustrating still another configuration of the sharpening processing portion which is included in the signal processing device according to the present invention.

So, with reference to FIG. 16, the configuration example of the sharpening processing portions 100e which include the absolute value processing unit 62 will be described. FIG. 16 is a block diagram which illustrates a configuration of the sharpening processing portion 100e.

As illustrated in the same figure, the sharpening processing portion 100e includes the high-frequency component extracting unit 11, a nonlinear processing unit 102e and the addition unit 15. Since the high-frequency component extracting unit 11 and the addition unit 15 are the same as those described above, the detailed description thereof will not be repeated here.

The nonlinear processing unit 102e includes the absolute value processing unit 62, the first differentiation unit 71, the second differentiation unit 81 and the multiplication unit 91. Since the first differentiation unit 71, the second differentiation unit 81 and the multiplication unit 91 are the same as those described above, the detailed description thereof will not be repeated here.

The absolute value processing unit 62 generates an absolute value signal S62 which is a signal corresponding to the absolute value of the high-frequency signal S11. That is, if the data string which configures the high-frequency signal S11 is X1, X2, X3, . . . , the absolute value signal S62 is a digital signal which is configured by a data string which is |X1|, |X2|, |X3|, . . . .

Next, the first differentiation unit 71 generates the first differentiated signal S72 by differentiating the absolute value signal S62 which is generated by the absolute value processing unit 62.

Then, the multiplication unit 91 generates the nonlinearly processed signal S12 by multiplying the first differentiated signal S72 by the second differentiated signal S81.

7. Embodiment 2

Since the high-frequency components which are included in the input signal SR are not always constant, it is preferred that the sharpening degree which is performed by the sharpening processing portion 100A is set according to the levels of the high-frequency components which are included in the input signal SR. That is, in a case where the high-frequency components included in the input signal SR are small, it is preferred that the sharpening degree performed by the sharpening processing portion 100A is set to be increased. On the other hand, in a case where the high-frequency components are included in the input signal SR, it is preferred that the sharpening degree performed by the sharpening processing portion 100A is set to be decreased. By setting in this manner, the sharpening will be neither too strong nor too weak, and can be performed appropriately.

Figure 17:
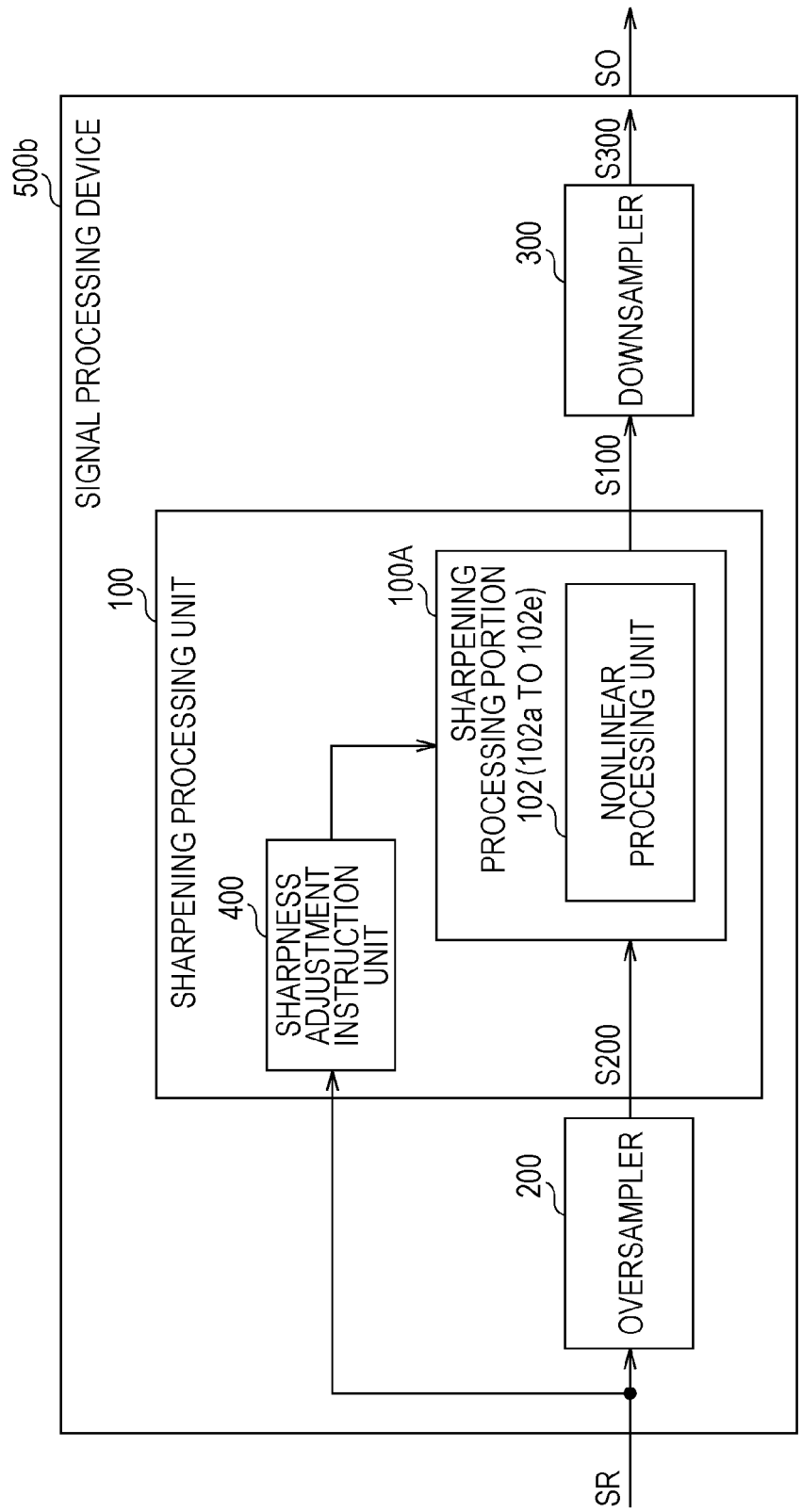
FIG. 17 is a block diagram illustrating a configuration of a signal processing device according to another embodiment of the present invention.

So, in the present embodiment, a form in which the sharpening degree which is performed by the sharpening processing portion 100A is set according to the levels of the high-frequency components included in the input signal SR will be described. The description regarding the present embodiment based on FIG. 17 is as follows. A signal processing device 500 according to the present embodiment is represented by a signal processing device 500b. In addition, for convenience of description, the members having the same function as each member described in the embodiment 1 are denoted by the same reference numerals, and the description will not be repeated except for a particular description.

With reference to FIG. 17, the configuration of the signal processing device 500b will be described. FIG. 17 is a block diagram illustrating the configuration of the signal processing device 500b. As illustrated in the same figure, in the signal processing device 500b, the sharpening processing unit 100 further includes a sharpness adjustment instruction unit (amplitude magnification value setting means, filter coefficient setting means) 400. In addition, in the same figure, the configuration in which the high band removal filter 350 is not included is illustrated, but the high band removal filter 350 may be included.

The sharpness adjustment instruction unit 400 inputs any one of the input signal SA and the oversampled signal S200, and extracts the high-frequency components included in the incoming signal. In addition, FIG. 17 illustrates a case where the input signal SA is inputted. The sharpness adjustment instruction unit 400 includes a high band pass filter thereinside, in order to extract the high-frequency components included in the incoming signal. The related high band pass filter is a generally known high pass filter, and as long as it removes direct current components in the incoming signal, any kind of filters may be used for the high band pass filter. In addition, the high band pass filter may be a one-dimensional filter, or a two-dimensional filter.

Then, the sharpness adjustment instruction unit 400 sets the sharpening degree using any one setting method of the two ways shown below, with respect to the sharpening processing portion 100A, according to the levels of the high-frequency components which are extracted.

A first setting method is a method by which the magnification value α that is multiplied to the sign transformation signal S41 by the limiter 51 of the sharpening processing portion 100A is set. That is, the lower the levels of the high-frequency components which are extracted by the sharpness adjustment instruction unit 400 are, the greater the value of the magnification value α is set. By setting the value of the magnification value α greater, the amplitude of the sign transformation signal S41 becomes large, and as a result, the amplitude of the nonlinearly processed signal S12 becomes large. Thereby, the sharpening degree which is performed by the sharpening processing portion 100A increases.

On the other hand, the higher the levels of the high-frequency components which are extracted by the sharpness adjustment instruction unit 400 are, the smaller the value of the magnification value α is set. By setting the value of the magnification value α small, the amplitude of the sign transformation signal S41 becomes small, and as a result, the amplitude of the nonlinearly processed signal S12 becomes small. Thereby, the sharpening degree which is performed by the sharpening processing portion 100A decreases.

A second setting method is a method by which a coefficient Cp of the filter 110 which is included in the high-frequency component extracting unit 11 of the sharpening processing portion 100A is set (frequency characteristic is changed). That is, as the levels of the high-frequency components which are extracted by the sharpness adjustment instruction unit 400 are low, each coefficient Cp is set so that the high-frequency components which pass through the filter 110 are large. If the coefficient Cp is set in this way, the high band signal SH1 becomes large, and as a result, the amplitude of the nonlinearly processed signal S12 becomes large. Thereby, the sharpening degree which is performed by the sharpening processing portion 100A increases.

On the other hand, as the levels of the high-frequency components which are extracted by the sharpness adjustment instruction unit 400 are high, each coefficient Cp is set so that the high-frequency components which pass through the filter 110 is small. If the coefficient Cp is set in this way, the high band signal SH1 becomes small, and as a result, the amplitude of the nonlinearly processed signal S12 becomes small. Thereby, the sharpening degree which is performed by the sharpening processing portion 100A decreases.

8. Embodiment 3

In the embodiment 2, the magnitude value α which is multiplied to the sign transformation signal S41 by the limiter 51 is set in one sharpening processing portion 100A, or by setting the coefficient Cp of the filter 110, the sharpening degree which is performed by the sharpening processing portion 100A is set. However, a configuration which performs the sharpening may be used by selecting one sharpening processing portion 100A, among the multiple sharpening processing portions 100A in which at least one of the magnification value α and the coefficient Cp is different.

Figure 18:
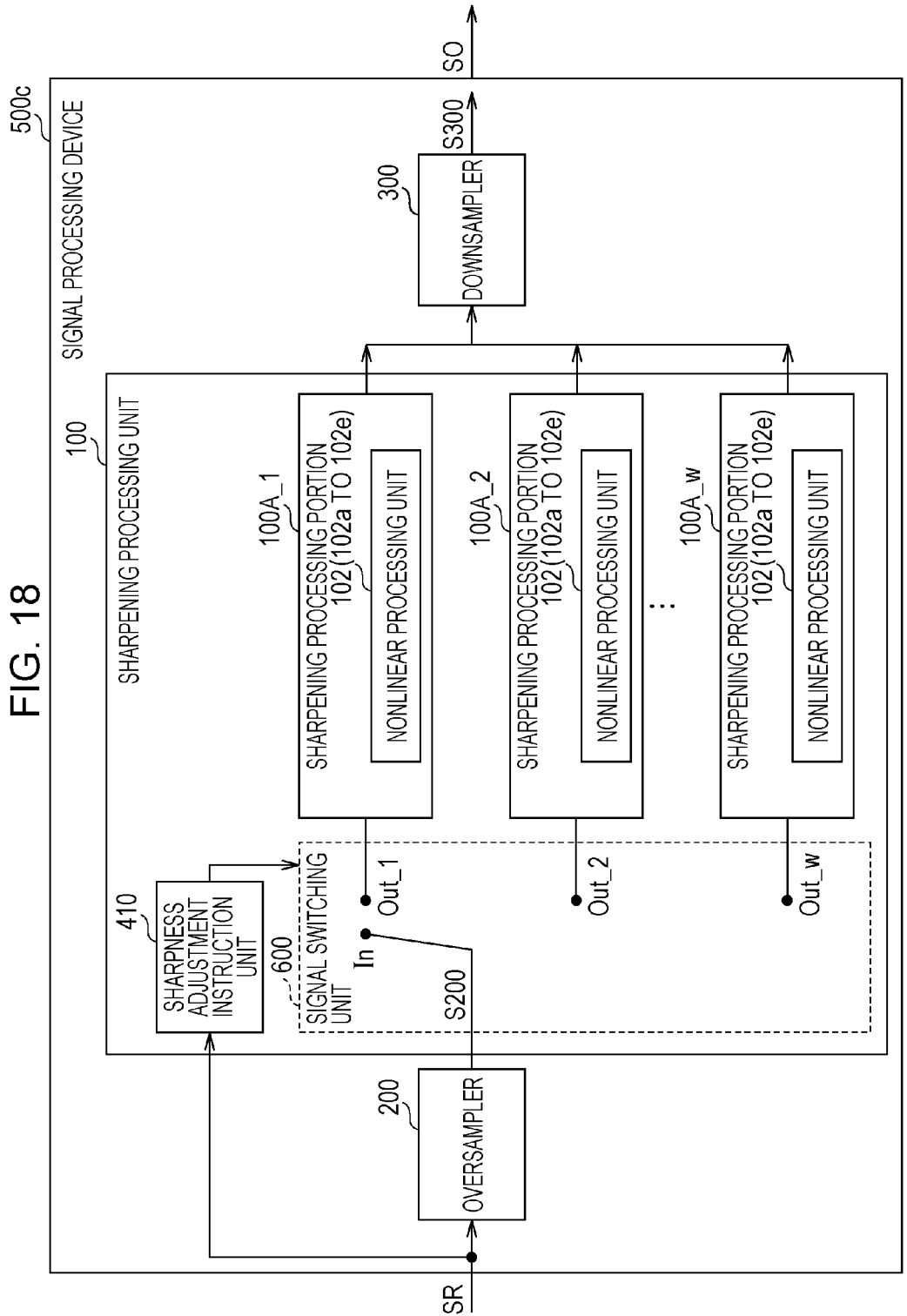
FIG. 18 is a block diagram illustrating a configuration of a signal processing device according to still another embodiment of the present invention.

So, in the present embodiment, a form in which the sharpening processing portion 100A is selected to be used according to the levels of the high-frequency components included in the input signal SR will be described. The description regarding the present embodiment based on FIG. 18 is as follows. The signal processing device 500 according to the present embodiment is represented by a signal processing device 500c. In addition, for convenience of description, the members having the same function as each member described in embodiments 1 and 2 are denoted by the same reference numerals, and the description will not be repeated except for a particular description.

With reference to FIG. 18, the configuration of the signal processing device 500c will be described. FIG. 18 is a block diagram illustrating the configuration of the signal processing device 500c. As illustrated in the same figure, the signal processing device 500c includes the sharpening processing unit 100 which includes a signal switching unit 600, a sharpness adjustment instruction unit 410, and w (w is two or greater arbitrary integers) sharpening processing portions 100A (sharpening processing portions 100A_1 to 100A_w), instead of the sharpening processing unit 100 which is included in the signal processing device 500a. In addition, in the same figure, the configuration in which the high band removal filter 350 is not included is illustrated, but the high band removal filter 350 may be included.

The sharpening processing portions 100A_1 to 100A_w are set so that the sharpening degrees are different from one another, respectively. The sharpening degree is set by adjusting at least one of the magnification value α which is multiplied to the sign transformation signal S41 by the limiter 51, and the coefficient Cp of the filter 110.

The signal switching unit 600 is a switch which connects a connection point In to one of connection points Out_1 to Out_w, according to a signal which is outputted from the sharpness adjustment instruction unit 410.

In the same manner as the sharpness adjustment instruction unit 400 described in embodiment 2, the sharpness adjustment instruction unit 410 inputs any one of the input signal SA and the oversampled signal S200 and extracts the high-frequency components included in the incoming signal. In addition, in FIG. 18, a case where the input signal SA is inputted is illustrated. The sharpness adjustment instruction unit 410 includes the high band pass filter thereinside, in order to extract the high-frequency components included in the incoming signal. Then, the sharpness adjustment instruction unit 410 outputs to the signal switching unit 600 the signal which shows whether to connect the connection point In to one of the connection points Out_1 to Out_w or not, according to the levels of the extracted high-frequency components.

For example, it is assumed that w equals 2, and it is set so that the sharpening degree of the sharpening processing portion 100A_1 is larger than that of the sharpening processing portion 100A_2. At this time, when the levels of the extracted high-frequency components are lower than a predetermined threshold value (hereinafter, represented as threshold value Tw), the signal showing that the connection point In is connected to the connection point Out_1 is outputted to the signal switching unit 600. Thereby, the sharpening degree of the original image increases. On the other hand, when the levels of the extracted high-frequency components are equal to or higher than the threshold value Tw, the signal showing that the connection point In is connected to the connection point Out_2 is outputted to the signal switching unit 600. Thereby, the sharpening degree of the original image decreases.

9. Embodiment 4

In performing the sharpening processing on the image represented by input signal SA, by performing the sharpening processing with respect to a horizontal-direction and a vertical-direction, high sharpening can be made. In addition, in a case where the image which is represented by the input signal SA, it is possible to sharpen greater by performing the sharpening processing further with respect to a time-direction. In addition, if the sharpening is performed in the time-direction, it is possible to suppress an occurrence of an afterimage.

So, in the present embodiment, with respect to the image which is represented by the input signal SA, a form in which the sharpening processing is performed with respect to the horizontal-direction, the vertical-direction, and the time-direction will be described. The description regarding the present embodiment based on FIGS. 19(*a*) and 19(*b*) is as follows. The signal processing device 500 according to the present embodiment is represented by a signal processing device 500*d*. In addition, for convenience of description, the members having the same function as each member described in the embodiments 1 to 3 are denoted by the same reference numerals, and the description will not be repeated except for a particular description.

As described above, each of the unit delay elements 111*h* included in the high-frequency component extracting unit 11 included in the sharpening processing portion 100A (1) may output the signal that is delayed by unit time in the horizontal-direction of the image represented by the incoming signal, (2) may output the signal that is delayed by the unit time in the vertical-direction of the image represented by the inputted signal, and (3) may output the signal that is delayed by the unit time (every frame) in the time-direction of the moving image represented by the inputted signal.

Then, in a case where each of the unit delay elements 111*h* has the configuration of (1) described above, the sharpening processing portion 100A performs the sharpening processing with regard to the horizontal-direction of the image. The sharpening processing regarding the horizontal-direction is represented as a horizontal-direction processing, hereinafter.

In addition, in a case where each of the unit delay elements 111*h* has the configuration of (2) described above, the sharpening processing portion 100A performs the sharpening processing with regard to the vertical-direction of the image. The sharpening processing regarding the vertical-direction is represented as a vertical-direction processing, hereinafter.

In addition, in a case where each of the unit delay elements 111*h* has the configuration of (3) described above, the sharpening processing portion 100A performs the sharpening processing with regard to the time-direction of the moving image. The sharpening processing regarding the time-direction is represented as a time-direction processing, hereinafter.

Figure 19:
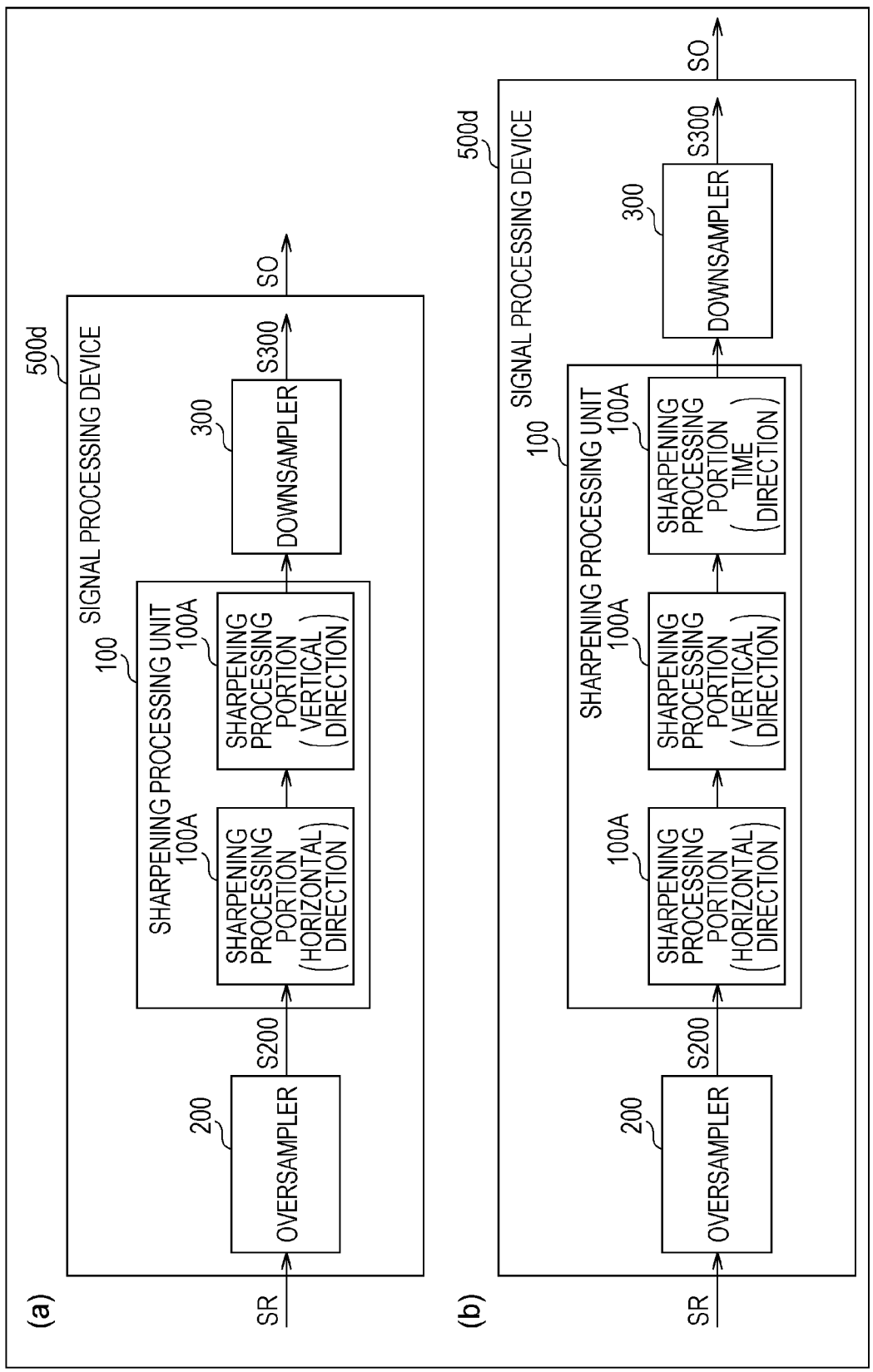
FIG. 19(a) is a block diagram illustrating a configuration of a signal processing device according to still another embodiment of the present invention.
FIG. 19(b) is a block diagram illustrating another configuration of the signal processing device according to the embodiment of the present invention.

With reference to FIGS. 19(*a*) and 19(*b*), the configuration of the signal processing device 500*d* will be described. FIGS. 19(*a*) and 19(*b*) are block diagrams illustrating the configuration of the signal processing device 500*d*. As illustrated in FIG. 19(*a*), the signal processing device 500*d* includes the oversampler 200 and the sharpening processing unit 100 that includes the sharpening processing portion 100A which performs the horizontal-direction processing, and the sharpening processing portion 100A which performs the vertical-direction processing. In addition, in a case where the image which is represented by the input signal SR is the moving image, as illustrated in FIG. 19(*b*), the sharpening processing unit 100 may include the sharpening processing portion 100A which performs the time-direction processing. A connection order of the sharpening processing portion 100A which performs the horizontal-direction processing, the sharpening processing portion 100A which performs the vertical-direction processing, and the sharpening processing portion 100A which performs the time-direction processing is not limited particularly, and may be generated in any manner.

In addition, the signal outputted from the sharpening processing portion 100A which performs the horizontal-direction processing corresponds to "horizontal sharpened signal" in the claims, the signal outputted from the sharpening processing portion 100A which performs the vertical-direction processing corresponds to "vertical sharpened signal" in the claims, and the signal outputted from the sharpening processing portion 100A which performs the time-direction processing corresponds to "time sharpened signal" in the claims.

In addition, as illustrated in FIGS. 19(*a*) and 19(*b*), the signal processing device 500*d* may include the downsampler 300. Whether to include the downsampler 300 or not is determined according to the field angle of the image which is represented by the output signal SO, as described above. In addition, in the same figures, the configuration without the high band removal filter 350 is illustrated, but the high band removal filter 350 may be included.

According to the configuration of the signal processing device 500*d*, the horizontal-direction processing and the vertical-direction processing, further the time-direction processing can be performed with respect to the image which is represented by the input signal SA, thereby the image which is represented by the input signal SA can be highly sharpened.

In addition, in order to accomplish a cost reduction and a processing speed improvement, a portion of the sharpening processing portion 100A may be omitted. For example, in the configuration illustrated in FIGS. 19(*a*) and 19(*b*), the sharpening processing portion 100A which performs the time-direction processing is omitted, only the two of the sharpening processing portion 100A which performs the horizontal-direction processing and the sharpening processing portion 100A which performs the vertical-direction processing may be included.

10. Embodiment 5

In the same manner as the embodiment 2, it is preferred that the sharpening degree which is performed by the sharpening processing portion 100A is set according to the levels of the high-frequency components included in the input signal SR, even in the configuration described in the embodiment 4.

Figure 20:
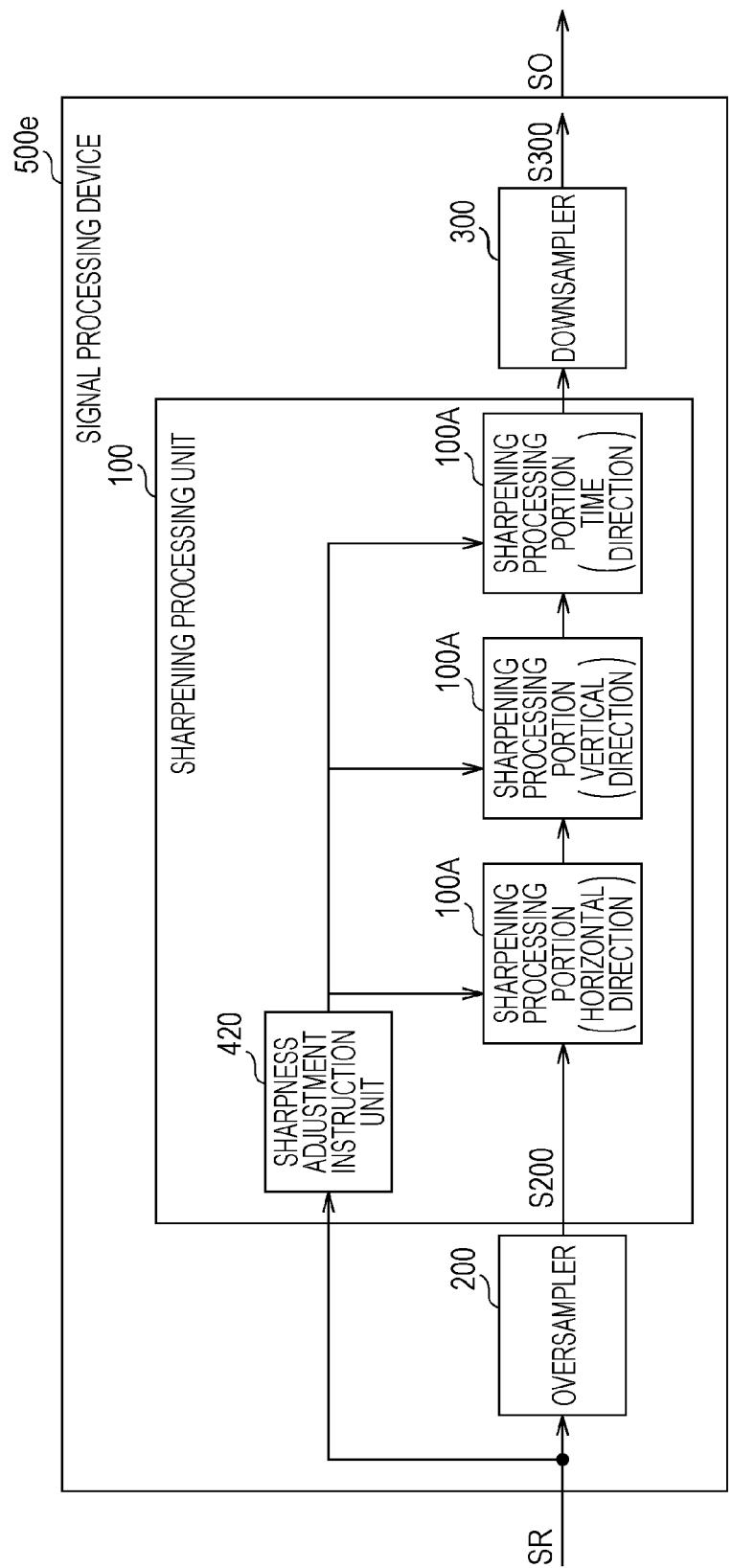
FIG. 20 is a block diagram illustrating a configuration of a signal processing device according to still another embodiment of the present invention.

So, in the present embodiment, according to the levels of the high-frequency components included in the input signal SR, a form in which the sharpening degree which is performed with respect to the horizontal-direction, the vertical-direction and the time-direction that is set will be described. The description regarding the present embodiment based on FIG. 20 is as follows. The signal processing device 500 according to the present embodiment is represented by a signal processing device 500e. For convenience of description, the members having the same function as each member described in the embodiments 1 to 4 are denoted by the same reference numerals, and the description will not be repeated except for a particular description.

With reference to FIG. 20, the configuration of the signal processing device 500e will be described. FIG. 20 is a block diagram illustrating a configuration of the signal processing device 500e. As illustrated in the same figure, the signal processing device 500e has a configuration in which a sharpness adjustment instruction unit 420 is added to the sharpening processing unit 100 in the signal processing device 500d. In addition, in FIG. 20, a configuration in which the sharpening processing portion 100A which performs the time-direction processing is included is illustrated, but the sharpening processing portion 100A is not always necessary to be included. In addition, in the same figure, the configuration without the high band removal filter 350 is illustrated, but the high band removal filter 350 may be included.

The sharpness adjustment instruction unit 420 inputs one of the input signal SA and the oversampled signal S200, and extracts the high-frequency components included in the inputted signal. In addition, in FIG. 20, a case where the input signal SA is inputted is illustrated. The sharpness adjustment instruction unit 420 includes the high band pass filter thereinside, in order to extract the high-frequency components included in the inputted signal. The related high band pass filter is a generally known high pass filter, and as long as it removes the direct current components in the incoming signal, any kind of filters may be used for the high band pass filter. In addition, the high band pass filter may be a one-dimensional filter, or a two-dimensional filter.

Then, the sharpness adjustment instruction unit 420 sets the sharpening degree with respect to at least one of the sharpening processing portion 100A which performs the horizontal-direction processing, the sharpening processing portion 100A which performs the vertical-direction processing, and the sharpening processing portion 100A which performs the time-direction processing, according to the levels of the high-frequency components which are extracted. Since a method for setting the sharpening degree is the same as the setting method described in the embodiment 2, the description thereof will not be repeated here.

11. Embodiment 6

Instead of the configuration described in the embodiment 5, as the configuration described in the embodiment 3, it may be the configuration which selects one sharpening processing portion 100A, from among multiple sharpening processing portions 100A in which at least one of the magnification value α and the coefficient Cp is different.

Figure 21:
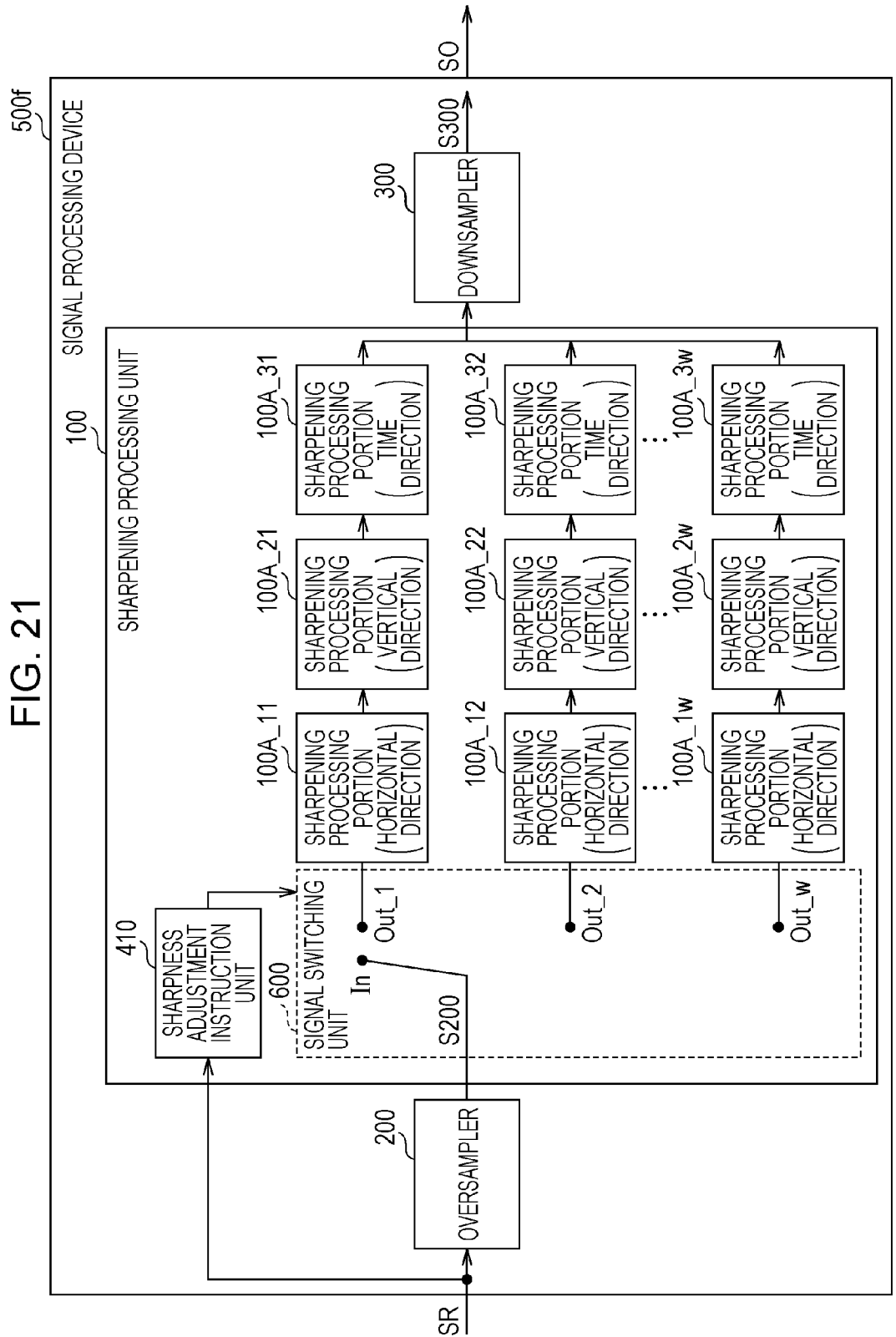
FIG. 21 is a block diagram illustrating a configuration of a signal processing device according to still another embodiment of the present invention.

So, in the present embodiment, according to the levels of the high-frequency components included in the input signal SR, a form in which one sharpening processing portion 100A which performs the horizontal-direction processing, one sharpening processing portion 100A which performs the vertical-direction processing, and one sharpening processing portion 100A which performs the time-direction processing are selected respectively will be described. The description regarding the present embodiment based on FIG. 21 is as follows. The signal processing device 500 according to the present embodiment is represented by a signal processing device 500f. For convenience of description, the members having the same function as each member described in the embodiments 1 to 5 are denoted by the same reference numerals, and the description will not be repeated except for a particular description.

With reference to FIG. 21, a configuration of the signal processing device 500f will be described. FIG. 21 is a block diagram illustrating the configuration of the signal processing device 500f. As illustrated in the same figure, instead of the sharpening processing unit 100 which is included in the signal processing device 500d, the signal processing device 500f includes the sharpness adjustment instruction unit 410, the signal switching unit 600, and the sharpening processing unit 100 including the sharpening processing portions 100A (sharpening processing portions 100A_11 to 100A_1w) which perform w (w is two or greater arbitrary integers) horizontal-direction processings, the sharpening processing portions 100A (sharpening processing portions 100A_21 to 100A_2w) which perform w (w is two or greater arbitrary integers) vertical-direction processings, and the sharpening processing portions 100A (sharpening processing portions 100A_31 to 100A_3w) which perform w (w is two or greater arbitrary integers) horizontal-direction processings. In addition, in the same figure, the configuration without the high band removal filter 350 is illustrated, but the high band removal filter 350 may be included.

The sharpening processing portions 100A_11 to 100A_1w are set to have a different sharpening degree from one another, respectively. Likewise, the sharpening processing portions 100A_21 to 100A_2w are set to have a different sharpening degree from one another, respectively. Likewise, the sharpening processing portions 100A_31 to 100A_3w are set to have a different sharpening degree from one another, respectively. In addition, the sharpening degree is set by adjusting at least one of the magnification value α which is multiplied to the sign transformation signal S41 by the limiter 51, and the coefficient Cp of the filter 110.

For example, it is assumed that w equals 2 and it is set so that the sharpening degree of the sharpening processing portion 100A_11 is larger than that of the sharpening processing portion 100A_12, the sharpening degree of the sharpening processing portion 100A_21 is larger than that of the sharpening processing portion 100A_22, and the sharpening degree of the sharpening processing portion 100A_31 is larger than that of the sharpening processing portion 100A_32. At this time, when the levels of the extracted high-frequency components are lower than the predetermined threshold value (hereinafter, referred to as threshold value Tw), the sharpness adjustment instruction unit 400 outputs the signal showing that the connection point In_1 is connected to the connection point Out_11 to the signal switching unit 600. Thereby, the sharpening degree of the original image increases.

On the other hand, when the levels of the extracted high-frequency components are equal to or higher than the threshold value Tw, the sharpness adjustment instruction unit 400 outputs the signal showing that the connection point In_1 is connected to the connection point Out_12 to the signal switching unit 600. Thereby, the sharpening degree of the original image decreases.

12. Sharpening Example of Actual Image

Next, with reference to the actual images illustrated in FIGS. 22(*a*) to 22(*d*), effects occurred by the sharpening processing which is performed by the signal processing device 500 will be described. In addition, here an example in which the sharpening processing is performed by the signal processing device 500*a* will be described.

First, FIG. 22(*a*) is a view illustrating an example of the original image which is represented by the input signal SR. In addition, the image illustrated in the same figure is reduced to a size smaller than the actual size on account of the limited space. As illustrated in the same figure, the related image is in a state where it is slightly blurred.

Next, FIG. 22(*b*) is a view illustrating an example of the image that is represented by an oversampled signal S200 which is obtained through the oversampler 200 from the input signal SR which represents the image illustrated in FIG. 22(*a*). Length and width thereof are enlarged two times, respectively.

Next, FIG. 22(*c*) is a view illustrating an example of the image that is represented by the sharpened signal S100 which is obtained through the sharpening processing unit 100 from the oversampled signal S200 which represents the image illustrated in FIG. 22(*b*). In the image illustrated in FIG. 22(*c*), as compared to the image illustrated in FIG. 22(*b*), it can be seen that blurring the twinkle in the eyes of a person, the ridge of the nose, the shape of a scarf and the like is remarkably decreased, and image quality and resolution are improved.

Next, FIG. 22(*d*) is a view illustrating an example of the image that is represented by the downsampled signal S300 which is obtained through the downsampler 300 from the sharpened signal S100 which represents the image illustrated in FIG. 22(*c*). Even in the image illustrated in FIG. 22(*d*), as compared to the image illustrated in FIG. 22(*a*), it can be seen that blurring the twinkle in the eyes of a person, the ridge of the nose, the shape of a scarf and the like is remarkably decreased, and image quality and resolution are improved.

13. Additional Matters

In addition, in the signal processing device according to the present invention, at least one of the nonlinear processing means, the horizontal nonlinear processing means, the vertical nonlinear processing means and the time nonlinear processing means may have a configuration in which a signal with a larger absolute value than that of the incoming signal is outputted, when the value of the incoming signal is near "0".

According to the above-described configuration, when the value of the incoming signal is near "0", the signal with a larger absolute value than that of the incoming signal is outputted.

Thus, in a section where the value of the incoming signal is near "0", the value of the signal which adds the output signal to the signal which is an object of the sharpening when the output signal is generated can be larger than that of the signal which is the object of the sharpening.

Therefore, in a section where the value of a low-frequency-removed signal is near "0", there is an effect which can steepen the rising and falling of the signal corresponding to an edge portion included in the signal which is the object of the sharpening.

Further, in the signal processing device according to the present invention, at least one of the low frequency component removal means, the horizontal low frequency component removal means, the vertical low frequency component removal means, and the time low frequency component removal means may have a configuration in which low level signal removal means that changes to zero a signal value in a portion with a smaller absolute value than that of a predetermined lower limit value among the signals to be outputted is further included, and high level signal removal means which changes only the absolute value of a signal value in a portion with a larger absolute value than that of a predetermined upper limit value among the signals which are output, to a value equal to or smaller than the related upper limit value, while preserving the sign of the signal value.

According to the above-described configuration, among the signals which are outputted, the signal value in the portion with the smaller absolute value than that of the predetermined lower limit value is changed to "0", and among the signals which are outputted, only the absolute value of the signal value in the portion with the larger absolute value than that of the predetermined upper limit value is changed to the value equal to or smaller than the related upper limit value, while preserving the sign of the signal value.

Thus, it is possible to remove the noise included in the signal which is outputted, and the high-frequency components with a large energy included in the signal which is outputted can be prevented from amplified by the nonlinear processing.

Therefore, there are effects that the noise is removed and the high-frequency components with large energy can be prevented from being amplified, in the signal which is outputted.

Finally, each block of the signal processing device 500 may be configured by a logic circuit which is formed in an integrated circuit (IC chip) as hardware, or may be implemented by software using a Central Processing Unit (CPU) as follows.

In a case where it is implemented by the software, the signal processing device 500 (particularly, sharpening processing unit 100) includes the CPU that executes a command of a control program which executes each function, a Read Only Memory (ROM) which stores the program, a Random Access Memory (RAM) which expands the program, a storage device (recording medium) such as a memory which stores the program and various data. Then, the objective of the present invention can also be achieved by supplying to the signal processing device 500 the recording medium in which a program sign (execution program, intermediate sign program, source program) of the control program in the signal processing device 500 which is the software executing the above-described functions is readably recorded in a computer, and by reading out and executing the program sign which is recorded in the recording medium using the computer (or one of CPU and MPU).

For example, as the recording medium, tapes such as a magnetic tape or cassette tape, disks such as a magnetic disk such as floppy (registered trademark) disk/hard disk or optical disks such as CD-ROM/MO/MD/DVD/CD-R, cards such as an IC card (including memory cards) or an optical card, semiconductor memories such as mask ROM/EPROM/EEPROM/flash ROM, and logic circuits such as a Programmable Logic Device (PLD), can be used.

In addition, the signal processing device 500 may be configured connectable to a communication network, or the program sign may be supplied through the communication network. As the communication network, which is not particularly limited, for example, the internet, an intranet, an extranet, a LAN, an ISDN, a VAN, a CATV communication network, a virtual private network, a telephone network, mobile communication network, satellite communication network or the like can be used. In addition, as a transmission medium which configures the communication network, which is not particularly limited, for example, a wire such as IEEE1394, a USB, a power line carrier, a cable TV line, a telephone line, or an ADSL line can also be used, and a wireless such as IrDA or infrared rays such as a remote controller, Bluetooth (registered trademark), an IEEE802.11 wireless, a High Data Rate (HDR), a Near Field Communication (NFC), a Digital Living Network Alliance (DLNA), a mobile phone network, a satellite line, or a terrestrial digital network can also be used.

In this way, in the present specification, the means does not necessarily mean physical means, and includes a case where the function of each means is executed by the software. Further, the function of one means may be executed by physical means of two or more, or the functions of the means of two or more may be executed by one physical means.

As described above, the signal processing device according to the present invention performs processing to sharpen an image represented by the input signal. The signal processing device that outputs the output signal which represents the sharpened image includes signal interpolation means which generates an interpolated signal by performing signal interpolation in order to increase a sampling frequency, with respect to the input signal, and sharpening means which inputs the interpolated signal and generates a sharpened signal in which high band frequency components in the interpolated signal are nonlinearly monotonically increased in a broad sense, and outputs the sharpened signal as the output signal.

In addition, the integrated circuit according to the present invention performs processing to sharpen the image represented by to the input signal. The integrated circuit that outputs the output signal which represents the sharpened image includes a signal interpolation circuit which generates the interpolated signal by performing the signal interpolation in order to increase the sampling frequency, with respect to the input signal, and a sharpening circuit which inputs the interpolated signal and generates the sharpened signal in which the high band frequency components in the interpolated signal are nonlinearly monotonically increased in a broad sense, and outputs the sharpened signal as the output signal.

Thus, it is possible to generate the sharpened signal in which the high band frequency components in the interpolated signal are nonlinearly monotonically increased in a broad sense. The interpolated signal is obtained by increasing the sampling frequency of the input signal.

Therefore, it is possible to add the high-frequency components without a distortion being occurred near the Nyquist frequency of the interpolated signal. Thus, there is an effect that can increase the sharpening degree without a necessity for suppressing the levels of the frequency components to be added. In addition, since it is possible to suppress the number of taps of the filter which extracts the frequency components, there is an effect that can accomplish a device minimization, a cost reduction and a processing load reduction.

Further, the signal processing device according to the present invention may have a configuration in which signal thinning means for thinning the signal is further included in order to decrease the sampling frequency from the sharpened signal.

According to the above-described configuration, further, in order to decrease the sampling frequency from the sharpened signal, the signal is thinned out. That is, a downsampling is performed with respect to the sharpened signal. Then, the interpolated signal after the thinning (downsampling) is outputted as the output signal.

Thus, there is an effect that can adjust the field angle of the image which is represented by the output signal.

For example, in a case where there is a need to make equal the field angle of the image which is represented by the input signal and the field angle of the image which is represented by the output signal, it is possible to output a desired output signal by performing the downsampling in the downsampling ratio which is the same as the oversampling ratio.

In addition, as another example, a case is considered where the input signal is a signal for a Standard Definition Television (SDTV) (horizontal pixel number: 720) and the output signal is a signal for a High Definition Television (HDTV) (horizontal pixel number: 1920). In this case, the input signal is oversampled to a signal with the horizontal pixel number of 5670 which is a least common multiple of 720 and 1920, and then the output signal may be generated by performing the sharpening processing with respect to the related signal and performing the downsampling.

Further, the oversampling and the downsampling may be performed in the time-direction. For example, a method of 60 fields (30 frames) per second is used in Japan and in the U.S. and a method of 50 fields (25 frames) per second is used in Europe. So, in a case where the input signal and the output signal are switched between these, the input signal is oversampled to a signal with 300 fields per second which is a least common multiple of 60 and 50, the sharpening processing is performed with respect to the related signal, and the downsampling is performed, and thereby the output signal may be generated.

Further, the signal processing device according to the present invention may be configured to further include high-frequency removal means which removes the high band frequency components included in the sharpened signal, before the signal is thinned by the signal thinning means from the sharpened signal.

According to the above-described configuration, the high band frequency components which are included in the sharpened signal is removed before the signal is thinned from the sharpened signal.

Thus, it is possible to remove the high band frequency components which can cause the distortion in the interpolated signal after the thinning, and then to perform the thinning.

Therefore, there is an effect that can suppress an occurrence of the distortion in the interpolated signal.

Further, the signal processing device according to the present invention may have a configuration in which the sharpening means further includes low frequency component removal means which generates a low-frequency-removed signal by removing low frequency components including at least direct current components, from the frequency components included in the interpolated signal, nonlinear processing means which generates a nonlinearly processed signal (i) which is identical in sign to the low-frequency-removed signal and (ii) which is nonlinearly monotonically increased in a broad sense with respect to the low-frequency-removed signal in case where the value of the low-frequency-removed signal is at least near "0", and addition means which generates and outputs as the sharpened signal an addition signal obtained by adding the nonlinearly processed signal to the interpolated signal.

According to the above-described configuration, further, the low-frequency-removed signal is generated by removing at least the direct current components, from the frequency components included in the interpolated signal. Then, in case where the value of the low-frequency-removed signal is at least near "0", a nonlinearly processed signal (i) which is identical in sign to the low-frequency-removed signal and (ii) which are nonlinearly monotonically increased in a broad sense with respect to the low-frequency-removed signal is generated. Then, the addition signal is generated by adding the nonlinearly processed signal to the interpolated signal and is outputted as the sharpened signal.

Thus, it is possible to output as the sharpened signal the signal obtained by performing the nonlinear processing with respect to the high-frequency components which are included in the interpolated signal.

Here, for example, the sharpened signal is generated by adding the low-frequency-removed signal to the nonlinearly processed signal obtained by performing the nonlinear processing such as squaring the low-frequency-removed signal. However, the sign of the sharpened signal and the sign of the low-frequency-removed signal are preserved.

In the sharpened signal which is generated in this way, the frequency components of a high band which are not included in the original frequency components are included. As a result, the generated sharpened signal includes the frequency components higher than the Nyquist frequency which is half of the sampling frequency in a case where the interpolated signal is discretized. With respect to this, as the related art, in the processing which performs the linear calculation with respect to the interpolated signal, it is not possible to compensate the high-frequency band beyond the Nyquist frequency.

Therefore, the signal processing device according to the present invention can generate the sharpened signal which steepens the rising and falling of the signal corresponding to an edge portion included in the input signal, as compared to the processing which performs the linear calculation with respect to the interpolated signal, and there is an effect which can greatly improve image quality and resolution.

Further, the signal processing device according to the present invention may have a configuration in which the sharpening means further includes horizontal sharpening means to which the interpolated signal is inputted and which and generates a horizontal sharpened signal obtained by sharpening a horizontal-direction signal which is a signal representing a pixel group formed by the pixels arranged adjacent to one another in a horizontal-direction of the image represented by the interpolated signal, and vertical sharpening means that generates and outputs as the sharpened signal a vertical sharpened signal obtained by sharpening a vertical-direction signal which is a signal representing a pixel group formed by the pixels arranged adjacent to one another in a vertical-direction of the image represented by the horizontal sharpened signal, the horizontal sharpening means includes horizontal low frequency component removal means which generates a horizontal low-frequency-removed signal by removing the low frequency components including at least the direct current components from the frequency components included in the horizontal-direction signal, horizontal nonlinear processing means which generates a horizontal nonlinearly processed signal (i) which is identical in sign to the horizontal low-frequency-removed signal and (ii) which is nonlinearly monotonically increased in a broad sense with respect to the horizontal low-frequency-removed signal in case where the value of the horizontal low-frequency-removed signal is at least near "0", and horizontal addition means which generates and outputs as the horizontal sharpened signal a horizontal addition signal obtained by adding the horizontal nonlinearly processed signal to the interpolated signal, and the vertical sharpening means includes vertical low frequency component removal means which generates a horizontal low-frequency-removed signal by removing the low frequency components including at least the direct current components from the frequency components included in the vertical-direction signal, vertical nonlinear processing means which generates a vertical nonlinearly processed signal (i) which is identical in sign to the vertical low-frequency-removed signal and (ii) which is nonlinearly monotonically increased in a broad sense with respect to the vertical low-frequency-removed signal in case where the value of the vertical low-frequency-removed signal is at least near "0", and vertical addition means which generates and outputs as the vertical sharpened signal a vertical addition signal obtained by adding the vertical nonlinearly processed signal to the horizontal sharpened signal.

According to the above-described configuration, further, the horizontal low-frequency-removed signal is generated by removing the low frequency components which include at least the direct current components, from the frequency components included in the horizontal-direction signal which is a signal representing the pixel group formed by the pixels arranged adjacent to one another in the horizontal-direction of the image represented by the interpolated signal, in case where the value of the horizontal low-frequency-removed signal is at least near "0", a horizontal nonlinearly processed signal (i) which is identical in sign to the horizontal low-frequency-removed signal and (ii) which is nonlinearly monotonically increased in a broad sense with respect to the horizontal low-frequency-removed signal is generated, and the horizontal sharpened signal is set by adding the horizontal nonlinearly processed signal to the interpolated signal. Then, the vertical low-frequency-removed signal is generated by removing the low frequency components which include at least the direct current components, from the frequency components included in the vertical-direction signal which is a signal representing the pixel group formed by the pixels arranged adjacent to one another in the vertical-direction of the image represented by the horizontal sharpened signal, in case where the value of the vertical low-frequency-removed signal is at least near "0", a vertical nonlinearly processed signal (i) which is identical in sign to the vertical low-frequency-removed signal and (ii) which is nonlinearly monotonically increased in a broad sense with respect to the vertical low-frequency-removed signal is generated, and the vertical sharpened signal is set by adding the vertical nonlinearly processed signal to the horizontal sharpened signal. Then, the vertical sharpened signal is outputted as the sharpened signal.

Thus, it is possible to output as the sharpened signal the signal obtained by performing the nonlinear processing with respect to the high-frequency components which are included in the horizontal-direction and vertical-direction of the interpolated signal.

Here, the horizontal sharpened signal is generated by adding the signal which is inputted to the horizontal nonlinearly processed signal obtained by performing the nonlinear processing such as squaring the horizontal low-frequency-removed signal. However, the sign of the signal which is generated and the sign of the horizontal low-frequency-removed signal is preserved. Likewise, the vertical sharpened signal is generated by adding the signal that is inputted to the vertical nonlinearly processed signal obtained by performing the nonlinear processing such as squaring the vertical low-frequency-removed signal. However, the sign of the generated signal is preserved as the sign of the vertical low-frequency-removed signal.

For this reason, in the horizontal sharpened signal and the vertical sharpened signal, the frequency components of a high band which are not included in the interpolated signal are included. As a result, the horizontal sharpened signal and the vertical sharpened signal include the frequency components higher than the Nyquist frequency which is half of the sampling frequency in a case where the interpolated signal is discretized.

Therefore, the signal processing device according to the present invention can generate the sharpened signal which steepens the rising and falling of the signal corresponding to the edge portion included in the input signal, as compared to the processing which performs the linear calculation with respect to the interpolated signal, and there is an effect which can highly improve quality of the image represented by the input signal and the image resolution.

Further, the signal processing device according to the present invention may have a configuration in which the sharpening means further includes time sharpening means to which the vertical sharpened signal is inputted and which generates a time sharpened signal obtained by sharpening a time-direction signal which is a signal representing a pixel group formed by the pixels arranged adjacent to one another in a time-direction of the image represented by the vertical sharpened signal, and the time sharpening means includes time low frequency component removal means which generates a time low-frequency-removed signal by removing the low frequency components which include at least the direct current components, from the frequency components which is included in the time-direction signal, and time nonlinear processing means that generates a time nonlinearly processed signal (i) which is identical in sign to the time low-frequency-removed signal and (ii) which is nonlinearly monotonically increased in a broad sense with respect to the time low-frequency-removed signal in case where the value of the time low-frequency-removed signal is at least near "0", and time addition means which outputs the time sharpened signal by adding the time nonlinearly processed signal to the vertical sharpened signal.

According to the above-described configuration, further, the time sharpened signal obtained by sharpening the time-direction signal which is the signal representing the pixel group formed by the pixels arranged adjacent to one another in a time-direction of the image represented by the vertical sharpened signal is generated. The time sharpening means generates the time low-frequency-removed signal by removing the low frequency components which include at least the direct current components from the frequency components which are included in the time-direction signal, generates the time nonlinearly processed signal (i) which is identical in sign to the time low-frequency-removed signal and (ii) which is nonlinearly monotonically increased in a broad sense with respect to the time low-frequency-removed signal in case where the value of the time low-frequency-removed signal is at least near "0", and generates the time sharpened signal by adding the time nonlinearly processed signal to the vertical sharpened signal.

Thus, further, it is possible to output as the sharpened signal the signal which performs the nonlinear processing with respect to a time-direction of the interpolated signal.

Therefore, there is an effect that the signal processing device according to the present invention can further highly sharpen the image which is represented by the input signal.

Further, according to the signal processing device of the present invention, at least one of the nonlinear processing means, the horizontal nonlinear processing means, the vertical nonlinear processing means, and the time nonlinear processing means may be configured to include even exponentiation calculation means that sets two or greater even numbers as exponents and generates an even exponentiated signal by exponentiating the incoming signal, and sign transformation means that inverts a sign of a portion with the sign different from the incoming signal among the even exponentiated signals and configured to output the even exponentiated signal in which the sign is inverted by the sign transformation means.

According to the above-described configuration, further, two or greater even numbers are set as the exponents and the even exponentiated signal is generated by exponentiating the incoming signal, the sign of the portion having the sign different from the frequency components prior to the exponentiation among the even exponentiated signals is inverted, and the inverted signal is outputted.

Thus, since the incoming signal is exponentiated by using two or greater even numbers as an exponent and the sign is outputted as the sign of the low-frequency-removed signal prior to the exponentiating is preserved, a signal which is obtained by adding the outputted signal to the incoming signal includes high-frequency components which are not included in the incoming signal.

Therefore, there is an effect which can steepen the rising and falling of the signal corresponding to the edge portion included in the signal which is the object of the sharpening, more than the method of performing the linear calculation in the related art.

Further, the signal processing device according to the present invention may have a configuration in which at least one of the nonlinear processing means, the horizontal nonlinear processing means, the vertical nonlinear processing means, and the time nonlinear processing means includes even exponentiation calculation means which generates the even exponentiated signal by exponentiating the input signal by using two or greater even numbers as the exponent, differentiation means that generates a differentiated signal by differentiating the even exponentiated signal and sign conversion means which inverts the sign of the portion of the even exponentiated signal having a sign different from that of a corresponding portion of the incoming signal, and the differentiated signal in which the sign of a portion has been inverted by the sign conversion means is outputted.

According to the above configuration, further, the even exponentiated signal is generated by exponentiating the input signal by using two or greater even numbers as the exponent, the differentiated signal is generated by differentiating the even exponentiated signal, the sign of the portion having sign different from the incoming signal among the differentiated signal s is inverted, and the inverted signal is outputted.

Thus, the incoming signal is exponentiated by using the two or greater even numbers as the exponent, the direct current components which can be included in the exponentiated signal is removed by the differentiating, and the sign of the incoming signal prior to the exponentiation is preserved and outputted as the sign. Accordingly, the signal which is obtained by adding the outputted signal to the incoming signal includes high-frequency components which are not included in the incoming signal.

Therefore, there is an effect which can steepen the rising and falling of the signal corresponding to the edge portion included in the signal which is the object of the sharpening, more than the method of performing the linear calculation in the related art. In addition, since the direct current components which can be included in the exponentiated signal is removed by the differentiating, the rising and falling of the signal can be steepened more than the case where the direct current components which can be included in the exponentiated signal is not removed.

Further, the signal processing device according to the present invention may have a configuration in which at least one of the nonlinear processing means, the horizontal nonlinear processing means, the vertical nonlinear processing means, and the time nonlinear processing means includes odd exponentiation calculation means which exponetiates the incoming signal by using three or greater odd numbers as the exponent, and the signal exponentiated by the odd exponentiation calculation means is outputted.

According to the above configuration, further, the incoming signal is exponentiated by using three or greater odd numbers as the exponent, and the exponentiated signal is outputted.

Thus, the incoming signal is exponentiated by using three or greater odd numbers as the exponent and outputted, accordingly, the signal which is obtained by adding the outputted signal to the incoming signal includes high-frequency components which are not included in the incoming signal.

Therefore, there is an effect which can steepen the rising and falling of the signal corresponding to the edge portion included in the signal which is the object of the sharpening, more than the method of performing the linear calculation in the related art.

Further, the signal processing device according to the present invention may have a configuration in which at least one of the nonlinear processing means, the horizontal nonlinear processing means, the vertical nonlinear processing means, and the time nonlinear processing means includes square root calculation means which generates a square root signal by multiplying a square root of the absolute value of the value generated by dividing the incoming signal by a maximum value which can be taken by the incoming signal, by the maximum value, and sign conversion means which inverts the sign of the portion of the square root signal having a sign different from that of a corresponding portion of the incoming signal, and the square root signal in which the sign of a portion has been inverted by the sign conversion means is outputted.

According to the above configuration, as a square root signal obtained by multiplying a square root of the absolute value of the value (that is, the value generated by normalizing the incoming signal) generated by dividing the incoming signal by the maximum value which can be taken by the incoming signal, by the maximum value, a signal in which the sign which is different from that of the incoming signal is preserved is outputted.

Thus, the signal which is obtained by adding the outputted signal to the incoming signal includes high-frequency components which are not included in the incoming signal.

Therefore, there is an effect which can steepen the rising and falling of the signal corresponding to the edge portion included in the signal which is the object of the sharpening, more than the method of performing the linear calculation in the related art.

Further, the signal processing device according to the present invention may have a configuration in which at least one of the nonlinear processing means, the horizontal nonlinear processing means, the vertical nonlinear processing means, and the time nonlinear processing means, and the time nonlinear processing means includes amplitude adjustment means which adjusts the amplitude of the signal to be outputted by multiplying a predetermined magnification value.

According to the above configuration, the amplitude of the signal to be outputted can be adjusted in a proper size. Therefore, there is an effect which can prevent the amplitude of the signal to be outputted from becoming too large.

Further, the signal processing device according to the present invention may have a configuration that further includes amplitude magnification value setting means which inputs one of the input signal and the interpolated signal, extracts the high-frequency components included in the inputted signal, and sets the predetermined magnification value according to an levels of the extracted high-frequency components.

According to the above configuration, the amplitude of the signal to be outputted can be adjusted in a proper size.

Therefore, there is an effect which can prevent the amplitude of the signal to be outputted from becoming too large.

Further, the signal processing device according to the present invention may have a configuration in which at least one of the low frequency component removal means, the horizontal low frequency component removal means, the vertical low frequency component removal means, and the time low frequency component removal means is a high band pass type filter with the taps of three or more.

According to the above configuration, since the filter is the high band pass type filter with the taps of three or more, at least the direct current components can be removed appropriately from the signal which is the object of the sharpening.

Thus, the signal which is obtained by adding the signal that is nonlinear-processed to the signal which is the object of the sharpening with respect to the signal except the direct current components included in the signal which is the object of the sharpening, includes a high-frequency components not included in the signal which is the object of the sharpening.

Therefore, there is an effect which can steepen the rising and falling of the signal corresponding to the edge portion included in the signal which is the object of the sharpening, more than the method of performing the linear calculation in the related art.

Further, the signal processing device according to the present invention may have a configuration that further includes filter coefficient setting means to which one of the input signal and the interpolated signal is inputted, and which extracts the high-frequency components included in the inputted signal, and sets the filter coefficient according to levels of the extracted high-frequency components.

According to the above configuration, the levels of the high-frequency components which go through the filter can be adjusted appropriately.

Therefore, there is an effect that can appropriately adjust the levels of the frequency components which perform the sharpening processing.

In addition, the signal processing device may be implemented by a computer. In this case, a control program of the signal processing device which implements the signal processing device in the computer by operating the computer as each means described above, and a computer readable recording medium in which the program is recorded are included within the scope of the present invention.

Further, a chip which includes the integrated circuit is included within the scope of the present invention.

The present invention is not limited to each embodiment described above, various modifications are possible within the scope of the claims, and embodiments obtained by appropriately combining the technical means disclosed in respective different embodiments are also included in the technical scope of the present invention.

Concrete embodiments or examples of implementation discussed in the foregoing paragraphs of the detailed description of the invention serve solely to clarify the technical details of the present invention, which should not be narrowly interpreted within the limits of such concrete examples only, but rather may be implemented in many variations within the scope of the claims described in the following and the spirit of the present invention.

INDUSTRIAL APPLICABILITY

The present invention can be applied to a device that processes a digital signal which represents an image. In particular, the present invention can be preferably applied to a display device which displays a still image and a moving image.

REFERENCE SIGNS LIST 11 high-frequency component extraction unit (low frequency component removal means, horizontal low frequency component removal means, vertical low frequency component removal means, time low frequency component removal means)
15 addition unit (addition means, horizontal addition means, vertical addition means, time addition means)
21 nonlinear calculation unit (even exponentiation calculation means, square root calculation means)
22 nonlinear calculation unit (odd exponentiation calculation means)
31 differentiation unit (differentiation means)
41 sign conversion unit (sign conversion means)
51 limiter (amplitude adjustment means)
100 sharpening processing unit (sharpening means, sharpening circuit)
100A, 100a to 100e sharpening processing portion (sharpening means, horizontal sharpening means, vertical sharpening means, time sharpening means)
102, 102a to 102e nonlinear processing unit (nonlinear processing means, horizontal nonlinear processing means, vertical nonlinear processing means, time nonlinear processing means)
200 oversampler (signal interpolation means, signal interpolation circuit)
300 downsampler (signal thinning means)
350 high band removal filter (high-frequency removal means)
400, 420 sharpening adjustment instruction unit (amplitude magnification value setting means, filter coefficient setting means)
410 sharpening adjustment instruction unit
500, 500a to 500f signal processing device (integrated circuit)
600 signal switching unit
S11 high-frequency signal (low-frequency-removed signal, horizontal low-frequency-removed signal, vertical low-frequency-removed signal, time low-frequency-removed signal)
S12 nonlinearly processed signal (horizontal nonlinearly processed signal, vertical nonlinearly processed signal, time nonlinearly processed signal)
S21 nonlinear signal (even exponentiated signal, square root signal)
S22 nonlinear signal
S31 differentiated signal
S100 sharpened signal
S200 oversampled signal (interpolated signal)
S300 downsampled signal
SR input signal
SO output signal

The invention claimed is:

1. A signal processing device that performs processing to sharpen an image represented by an input signal and outputs an output signal that represents the sharpened image, comprising:
a signal interpolation circuit configured to generate an interpolated signal by performing signal interpolation on the input signal;
a sharpening circuit to which the interpolated signal is inputted and configured to generate a sharpened signal in which high band frequency components in the interpolated signal are nonlinearly monotonically increased; and
a signal thinning circuit to which the sharpened signal is inputted and configured to generate a downsampled signal by thinning a signal from the sharpened signal,
wherein the downsampled signal is outputted as the output signal,
the sharpening circuit further includes:
a low frequency component removal circuit configured to generate a low-frequency-removed signal by removing low frequency components which include at least direct current components, from frequency components included in the interpolated signal;
a nonlinear processing circuit configured to generate a nonlinearly processed signal (i) which is identical in sign to the low-frequency-removed signal and (ii) which is non-linearly monotonically increased with respect to the low-frequency-removed signal in a case where a value of the low-frequency-removed signal is at least near zero; and
an addition circuit configured to generate an addition signal by adding the nonlinearly processed signal to the interpolated signal and output the addition signal as the sharpened signal.

2. The signal processing device according to claim 1, further comprising:
a high frequency removal circuit configured to remove high band frequency components included in the sharpened signal before the signal is thinned from the sharpened signal by the signal thinning circuit.

3. The signal processing device according to claim 1,
wherein the nonlinear processing circuit includes:
an even exponentiation calculation circuit configured to generate an even exponentiated signal by exponentiating an incoming signal by using an even number of two or more as an exponent; and
a sign conversion circuit configured to invert a sign of a portion of the even exponentiated signal having a sign different from that of a corresponding portion of the incoming signal, and
wherein the even exponentiated signal in which the sign of a portion has been inverted by the sign conversion circuit is outputted.

4. The signal processing device according to claim 1,
wherein the nonlinear processing circuit includes:
an even exponentiation calculation circuit configured to generate an even exponentiated signal by exponentiating an incoming signal by using an even number of two or more as an exponent;

a differentiation circuit configured to generate a differentiated signal by differentiating the even exponentiated signal; and a sign conversion circuit configured to invert a sign of a portion of the differentiated signal having a sign different from that of a corresponding portion of the incoming signal, and wherein the differentiated signal in which the sign of a portion has been inverted by the sign conversion circuit is outputted.

5. The signal processing device according to claim 1, wherein the nonlinear processing circuit includes an odd exponentiation calculation circuit configured to exponentiate an incoming signal by using an odd number of three or more as an exponent, and wherein the exponentiated signal produced by the odd exponentiation calculation circuit is outputted.

6. The signal processing device according to claim 1, wherein the nonlinear processing circuit includes:

a square root calculation circuit configured to generate a square root signal by multiplying a square root of an absolute value of a value generated by dividing an incoming signal by a maximum value which can be taken by the incoming signal, by the maximum value; and a sign conversion circuit configured to invert a sign of a portion of the square root signal having a sign different from that of a corresponding portion of the incoming signal, and wherein the square root signal in which the sign of a portion has been inverted by the sign conversion circuit is outputted.

7. The signal processing device according to claim 1, wherein the nonlinear processing circuit further includes an amplitude adjustment circuit configured to adjust an amplitude of a signal to be outputted, by multiplying the signal by a predetermined magnification value.

8. The signal processing device according to claim 7, further comprising:

an amplitude magnification value setting circuit to which one of the input signal and the interpolated signal is inputted and is configured to extract the high frequency components included in the inputted signal, and set the predetermined magnification value according to the levels of the extracted high frequency components.

9. The signal processing device according to claim 1, wherein the low frequency component removal circuit includes a high band pass type filter with three or more taps.

10. The signal processing device according to claim 9, further comprising:

a filter coefficient setting circuit to which one of the input signal and the interpolated signal is inputted and configured to extract the high frequency components included in the inputted signal, and set the filter coefficient according to the levels of the extracted high frequency components.

11. A signal processing device that performs processing to sharpen an image represented by an input signal and outputs an output signal that represents the sharpened image, comprising:

a signal interpolation circuit configured to generate an interpolated signal by performing signal interpolation on the input signal;

a sharpening circuit to which the interpolated signal is inputted and configured to generate a sharpened signal in which high band frequency components in the interpolated signal are nonlinearly monotonically increased; and a signal thinning circuit to which the sharpened signal is inputted and configured to generate a downsampled signal by thinning a signal from the sharpened signal, wherein the downsampled signal is outputted as the output signal, the sharpening circuit further includes:

a horizontal sharpening circuit to which the interpolated signal is inputted and configured to generate a horizontal sharpened signal which is obtained by sharpening a horizontal direction signal which is a signal representing a pixel group formed from pixels arranged adjacent to one another in a horizontal direction of the image represented by the interpolated signal; and a vertical sharpening circuit to which the horizontal sharpened signal is inputted and configured to generate a vertical sharpened signal which is obtained by sharpening a vertical direction signal which is a signal representing a pixel group formed from pixels arranged adjacent to one another in a vertical direction of the image represented by the horizontal sharpened signal, and outputs the generated vertical sharpened signal as the sharpened signal, wherein the horizontal sharpening circuit includes:

a horizontal low frequency component removal circuit configured to generate a horizontal low-frequency-removed signal by removing low frequency components which include at least direct current components, from frequency components included in the horizontal direction signal;

a horizontal nonlinear processing circuit configured to generate a horizontal nonlinearly processed signal (i) which is identical in sign to the horizontal low-frequency-removed signal and (ii) which is nonlinearly monotonically increased with respect to the horizontal low-frequency-removed signal in a case where a value of the horizontal low-frequency-removed signal is at least near zero; and a horizontal addition circuit configured to generate a horizontal addition signal by adding the horizontal nonlinearly processed signal to the interpolated signal and outputs the generated horizontal addition signal as the horizontal sharpened signal, wherein the vertical sharpening circuit includes:

a vertical low frequency component removal circuit configured to generate a vertical low-frequency-removed signal by removing the low frequency components which include at least the direct current components, from frequency components included in the vertical direction signal;

a vertical nonlinear processing circuit configured to generate a vertical nonlinearly processed signal (i) which is identical in sign to the vertical low-frequency-removed signal and (ii) which is nonlinearly monotonically increased with respect to the vertical low-frequency-removed signal in case where a value of the vertical low-frequency-removed signal is at least near zero; and a vertical addition circuit configured to generate a vertical addition signal by adding the vertical nonlinearly processed signal to the horizontal sharpened signal and output the generated vertical addition signal as the vertical sharpened signal.

12. The signal processing device according to claim 11, wherein the sharpening circuit further includes a time sharpening circuit to which the vertical sharpened signal is inputted and configured to generate a time sharpened signal which is obtained by sharpening a time direction signal which is a signal representing a pixel group formed from pixels arranged adjacent to one another in a time direction of the image represented by the vertical sharpened signal, wherein the time sharpening circuit includes:

a time low frequency component removal circuit configured to generate a time low-frequency-removed signal by removing the low frequency components which include at least the direct current components, from frequency components included in the time direction signal;

a time nonlinear processing circuit configured to generate a time nonlinearly processed signal (i) which is identical in sign to the time low-frequency-removed signal and (ii) which is nonlinearly monotonically increased with respect to the time low-frequency-removed signal in a case where a value of the time low-frequency-removed signal is at least near zero; and a time addition circuit configured to output the time sharpened signal by adding the time nonlinearly processed signal to vertical sharpened signal.

13. An integrated circuit that performs processing to sharpen an image represented by an input signal and outputs an output signal that represents the sharpened image, comprising:

a signal interpolation circuit configured to generate an interpolated signal by performing signal interpolation on the input signal;

a sharpening circuit to which the interpolated signal is inputted and configured to generate a sharpened signal in which high band frequency components in the interpolated signal are nonlinearly monotonically increased; and a signal thinning circuit to which the sharpened signal is inputted and configured to generate a downsampled signal by thinning a signal from the sharpened signal, wherein the downsampled signal is outputted as the output signal, the sharpening circuit further includes:

a low frequency component removal circuit configured to generate a low-frequency-removed signal by removing low frequency components which include at least direct current components, from frequency components included in the interpolated signal;

a nonlinear processing circuit configured to generate a nonlinearly processed signal (i) which is identical in sign to the low-frequency-removed signal and (ii) which is non-linearly monotonically increased with respect to the low-frequency-removed signal in a case where a value of the low-frequency-removed signal is at least near zero; and an addition circuit configured to generate an addition signal by adding the nonlinearly processed signal to the interpolated signal and output the addition signal as the sharpened signal.

* * * * *